US011832548B2

(12) United States Patent
Ishikawa et al.

(10) Patent No.: US 11,832,548 B2
(45) Date of Patent: Dec. 5, 2023

(54) AGRICULTURAL MACHINE

(71) Applicant: KUBOTA CORPORATION, Osaka (JP)

(72) Inventors: Shinnosuke Ishikawa, Sakai (JP); Fumiya Yoshimura, Sakai (JP); Ken Sakuta, Sakai (JP)

(73) Assignee: KUBOTA CORPORATION, Osaka (JP)

( * ) Notice: Subject to any disclaimer, the term of this patent is extended or adjusted under 35 U.S.C. 154(b) by 0 days.

(21) Appl. No.: 17/672,740

(22) Filed: Feb. 16, 2022

(65) Prior Publication Data

US 2022/0167545 A1 Jun. 2, 2022

Related U.S. Application Data

(63) Continuation of application No. PCT/JP2020/032627, filed on Aug. 28, 2020.

(30) Foreign Application Priority Data

Sep. 6, 2019 (JP) ................................. 2019-163353

(51) Int. Cl.
*A01B 69/00* (2006.01)
*A01B 79/00* (2006.01)
(Continued)

(52) U.S. Cl.
CPC .......... *A01B 69/008* (2013.01); *A01B 79/005* (2013.01); *G05D 1/0212* (2013.01); *G05D 1/0276* (2013.01); *G05D 2201/0201* (2013.01)

(58) Field of Classification Search
CPC .. A01B 69/008; A01B 79/005; G05D 1/0212; G05D 1/0276; G05D 2201/0201
See application file for complete search history.

(56) References Cited

U.S. PATENT DOCUMENTS

2016/0278277 A1 9/2016 Valberg
2019/0122454 A1 4/2019 Fukunaga et al.

FOREIGN PATENT DOCUMENTS

EP 3 457 346 A1 3/2019
JP 9-154315 A 6/1997
(Continued)

OTHER PUBLICATIONS

Official Communication issued in International Patent Application No. PCT/JP2020/032627, dated Nov. 17, 2020.
(Continued)

*Primary Examiner* — Rodney A Butler
(74) *Attorney, Agent, or Firm* — Keating & Bennett, LLP

(57) ABSTRACT

In an agricultural machine, a route creator creates a planned traveling route for a traveling vehicle body in a work area where a working device works using a material. An area setter sets, outside the work area, a replenishment area to replenish the material. A charge amount acquirer acquires a charge amount of the material. A remaining amount calculator calculates a remaining amount of the material based on the charge amount acquired and a material consumption of the material consumed by the work. A position setter sets a replenishment position to replenish the material in the replenishment area set by the area setter based on the remaining amount calculated by the remaining amount calculator. A position changer changes the replenishment position when a change reception switch receives change of the replenishment position. A display displays the changed replenishment position.

20 Claims, 21 Drawing Sheets

(51) Int. Cl.
　　　*G05D 1/02*　　　(2020.01)
　　　*A01B 69/04*　　 (2006.01)

(56) References Cited

FOREIGN PATENT DOCUMENTS

| | | |
|---|---|---|
| JP | 2016-7196 A | 1/2016 |
| JP | 2018-39 A | 1/2018 |
| JP | 2018-50491 A | 4/2018 |
| JP | 2018-117561 A | 8/2018 |
| WO | 2015/065282 A1 | 5/2015 |
| WO | 2018/116772 A1 | 6/2018 |

OTHER PUBLICATIONS

Official Communication issued in corresponding European Patent Application No. 20860895.0, dated Aug. 30, 2023.

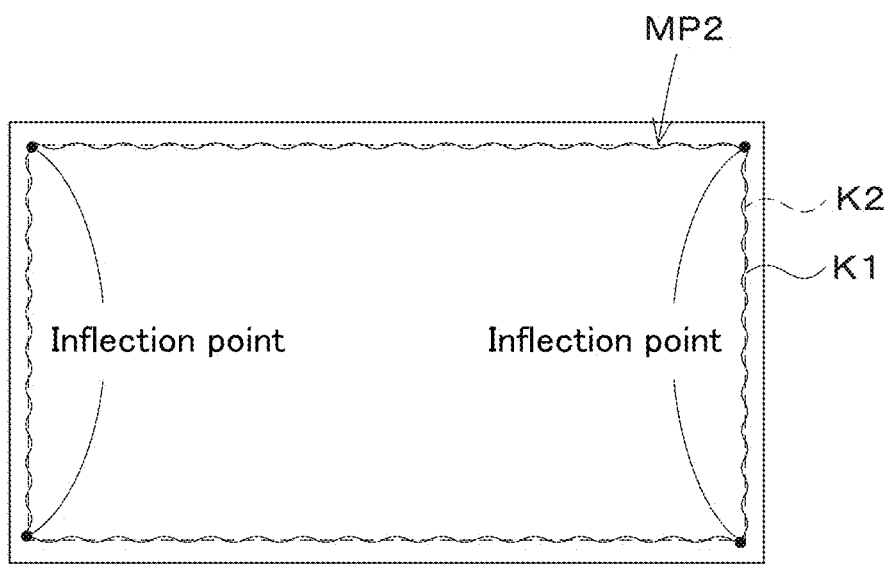

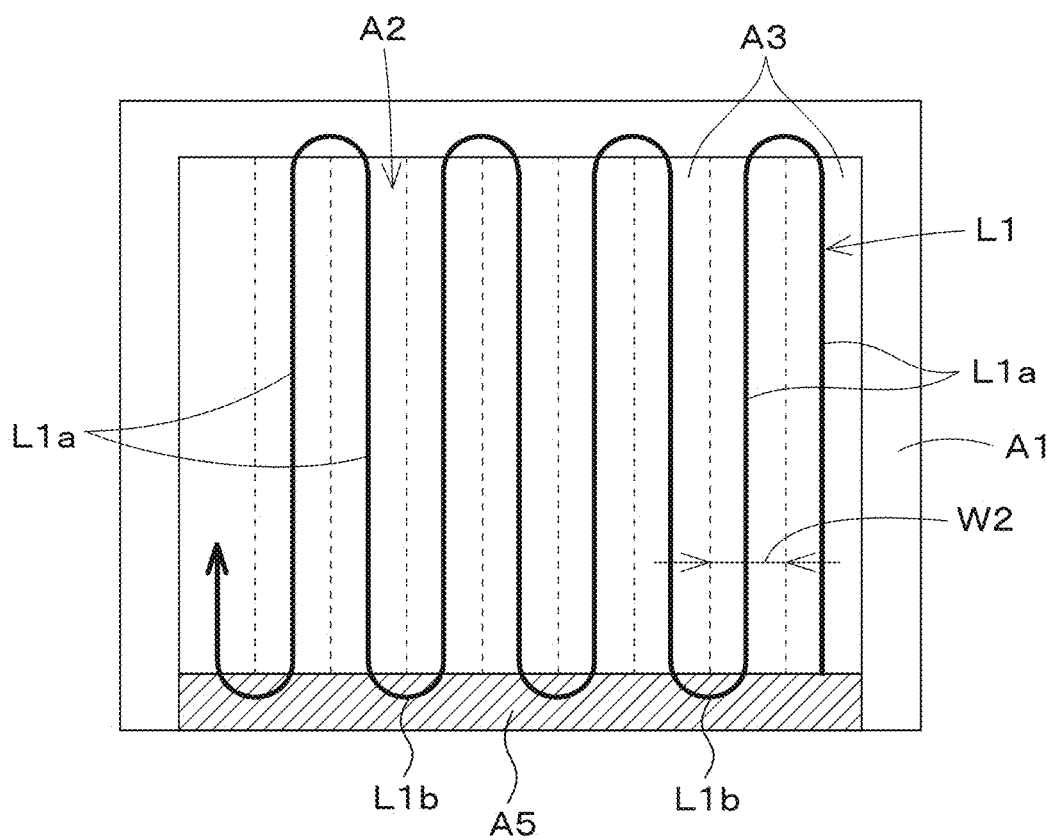

Fig.10C
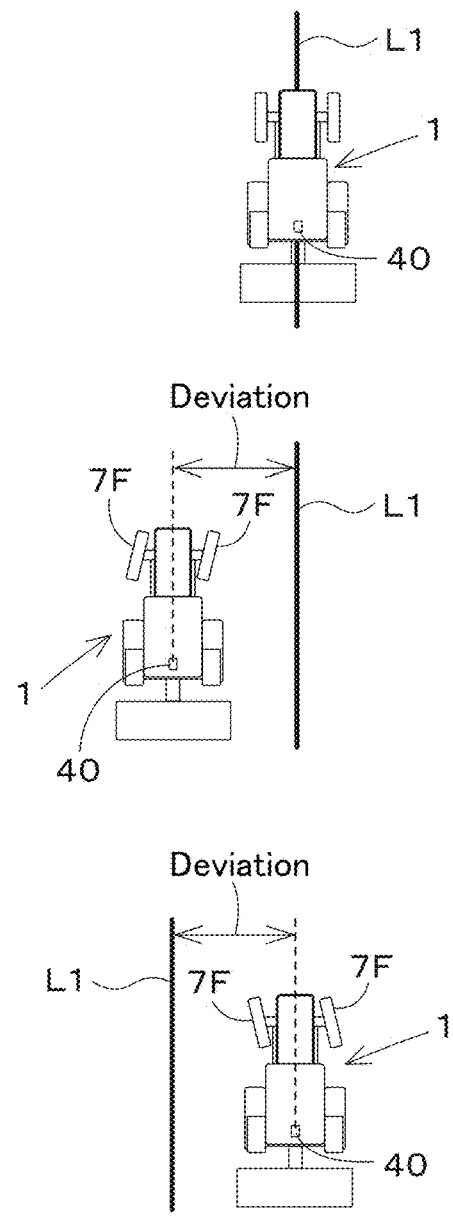
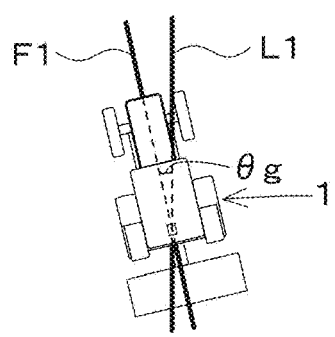

AGRICULTURAL MACHINE

CROSS REFERENCE TO RELATED APPLICATIONS

This application is a continuation application of International Application No. PCT/JP2020/032627, filed on Aug. 28, 2020, which claims the benefit of priority to Japanese Patent Application No. 2019-163353, filed on Sep. 6, 2019. The entire contents of each of these applications are hereby incorporated herein by reference.

BACKGROUND OF THE INVENTION

1. Field of the Invention

The present invention relates to an agricultural machine such as a tractor.

2. Description of the Related Art

A technique disclosed in Japanese Unexamined Patent Publication No. 2018-39 is known as a technique to create a traveling path (work traveling line) for automatically operating a work vehicle such as a tractor. A work vehicle of Japanese Unexamined Patent Publication No. 2018-39 includes an acquisition unit that acquires positional data of an outer periphery of an agricultural field, and a work setting unit that sets, in the agricultural field, a work traveling line on which a traveling machine body travels on the basis of the positional data. The work vehicle further includes a material remaining amount detection unit that detects a remaining amount of a material loaded on the work vehicle, and a material notification unit that notifies, when the remaining amount of the material becomes small, a driver so that the material can be replenished after the traveling machine body finishes traveling along the work traveling line.

SUMMARY OF THE INVENTION

In Japanese Unexamined Patent Publication No. 2018-39, although the work traveling line can be created, it is not possible to identify a location where the material runs out at a point in time when the work traveling line is created. Thus, when the work vehicle is actually operated to travel, it is necessary to end the automatic operation at any position where the amount of the material becomes so small as to require the material replenishment. That is, in Japanese Unexamined Patent Publication No. 2018-39, the materials may run out midway on the work traveling line. Further, when a material amount grasped in the work vehicle differs from the amount of materials actually loaded on the work vehicle, the materials may run out at an unexpected place.

Preferred embodiments of the present invention provide agricultural machines each capable of easily and efficiently replenishing a material.

An agricultural machine according to a preferred embodiment of the present invention includes a traveling vehicle body capable of traveling, a route creator to create a planned traveling route for the traveling vehicle body in a work area where a working device provided on the traveling vehicle body performs work using a material, an area setter to set, outside the work area, a replenishment area where the material is replenished, a charge amount acquirer to acquire a charge amount of the material loaded on the working device, a remaining amount calculator to calculate a remaining amount of the material based on the charge amount acquired by the charge amount acquirer and a material consumption of the material consumed by the work, a position setter to set a replenishment position where the material is replenished in the replenishment area set by the area setter based on the remaining amount calculated by the remaining amount calculator, a change reception switch to receive a change of the replenishment position, a position changer to change the replenishment position when the change reception switch receives the change, and a display to display a changed position that is the changed replenishment position.

The route creator is configured or programmed to create a turning route passing through the replenishment area from the work area and returning to the work area again. The position setter is configured or programmed to set the replenishment position in a portion of the replenishment area corresponding to the turning route.

The position setter is configured or programmed to set the replenishment position on turning routes having a same turning direction of the traveling vehicle body among a plurality of the turning routes.

The position changer is configured or programmed to set the changed position before the replenishment position in a traveling direction of the planned traveling route in the portion of the replenishment area corresponding to the turning route.

The agricultural machine further includes an automatic operation controller configured or programmed to cause the working device to perform work while automatically operating the traveling vehicle body based on the planned traveling route. When the change reception switch receives the change, the automatic operation controller is configured or programmed to cause, when a remaining amount of the material is not zero, the traveling vehicle body to travel up to a position where the material runs out to end the work and then to cause the traveling vehicle body to return to the changed position.

The agricultural machine further includes an automatic operation controller configured or programmed to cause the working device to perform work while automatically operating the traveling vehicle body based on the planned traveling route. When the change reception switch receives the change, the automatic operation controller is configured or programmed to stop the work performed by the working device to end the work and then to cause the traveling vehicle body to return to the changed position.

In a case where the working device is a spreading device, when the change reception switch receives the change, the automatic operation controller is configured or programmed to stop a spreading operation of the spreading device.

The agricultural machine further includes a PTO shaft to transmit power to the working device, and a PTO clutch switchable between an engaged state where the power of the PTO shaft is transmitted to the working device and a disengaged state where the power of the PTO shaft is not transmitted to the working device. When the change reception switch receives the change, the automatic operation controller is configured or programmed to switch the PTO clutch from the engaged state to the disengaged state.

The agricultural machine further includes a lifter to raise and lower the working device so as to have an attitude switchable between a working attitude and a retracted attitude. When the change reception switch receives the change, the automatic operation controller is configured or programmed to turn the lifter from the working attitude to the retracted attitude.

After replenishment of the material, the automatic operation controller is configured or programmed to move the traveling vehicle body to a point where the work is ended and resumes the work.

The display is capable of displaying a setting screen to set the charge amount of the material. The charge amount acquirer is configured or programmed to acquire the charge amount set on the setting screen of the display.

The display is capable of displaying the planned traveling route created by the route creator, the replenishment area set by the area setter, and the replenishment position set in the replenishment area. When the change reception switch receives a change of the replenishment position, the display is capable of displaying the change of the replenishment position set in the replenishment area.

When a change destination replenishment position is selected in the replenishment area after selection of a pre-change replenishment position, the position changer is configured or programmed to set the selected change destination replenishment position as a post-change replenishment position and delete the pre-change replenishment position.

After a replenishment position is selected, the position changer is configured or programmed to set the selected replenishment position as a post-change replenishment position.

The above and other elements, features, steps, characteristics and advantages of the present invention will become more apparent from the following detailed description of the preferred embodiments with reference to the attached drawings.

BRIEF DESCRIPTION OF THE DRAWINGS

A more complete appreciation of preferred embodiments of the present invention and many of the attendant advantages thereof will be readily obtained as the same becomes better understood by reference to the following detailed description when considered in connection with the accompanying drawings described below.

FIG. 4B is a diagram illustrating obtaining the outline of the agricultural field (agricultural map) from inflection points of the traveling track.

FIG. 8C is an explanatory diagram for explaining creation of a planned traveling route L1.

FIG. 10C is an explanatory diagram for explaining an automatic operation.

DETAILED DESCRIPTION OF THE PREFERRED EMBODIMENTS

Figure 1:
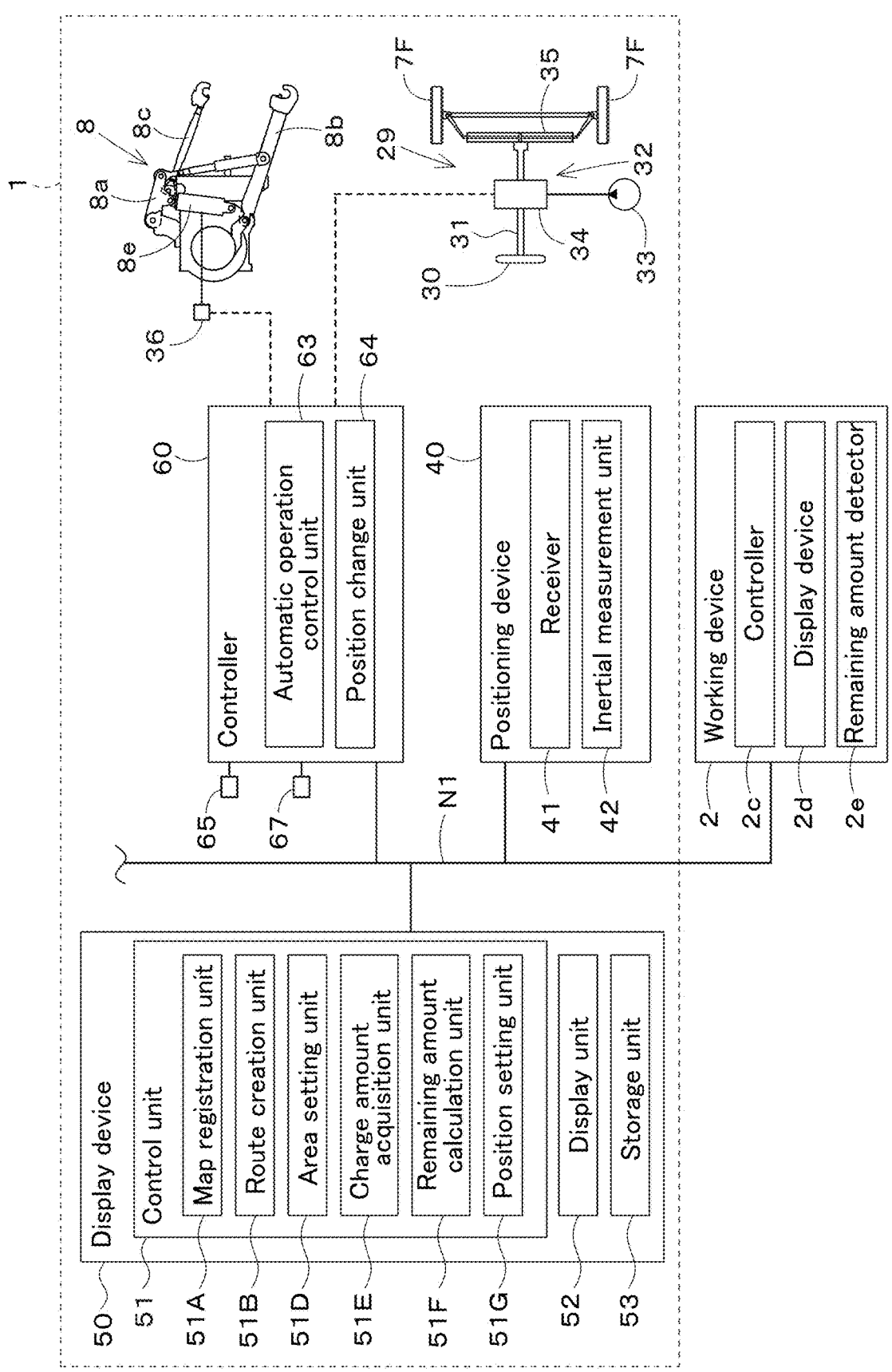
FIG. 1 is a block diagram of an agricultural machine.

The preferred embodiments will now be described with reference to the accompanying drawings, wherein like reference numerals designate corresponding or identical elements throughout the various drawings. The drawings are to be viewed in an orientation in which the reference numerals are viewed correctly.

Hereinbelow, preferred embodiments of the present invention will be described with reference to the drawings.

Figure 14:
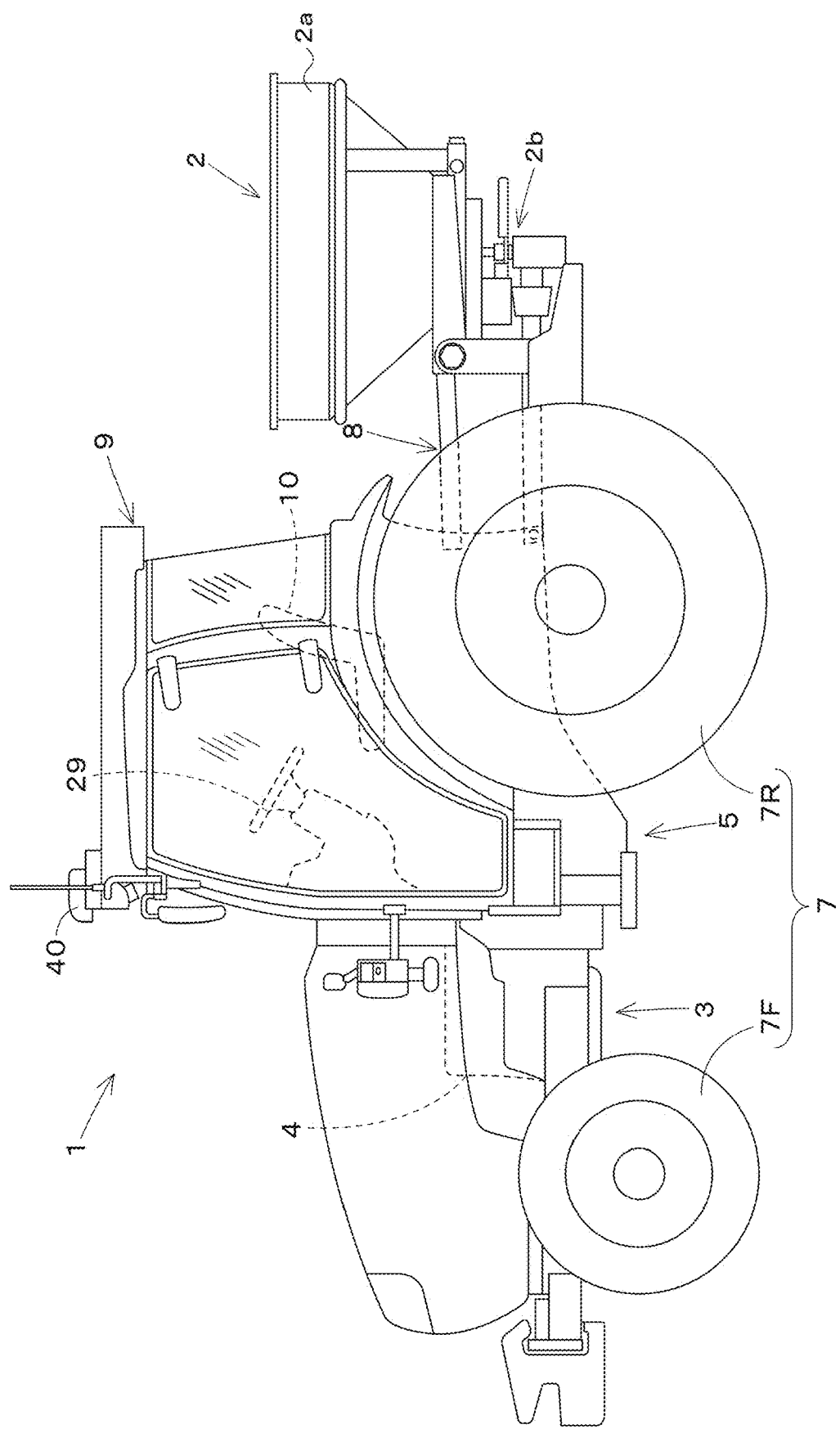
FIG. 14 is a side overall view of a tractor.

FIG. 14 illustrates a tractor 1, which is an example of an agricultural machine. Although the tractor 1 will be described as an example of the agricultural machine, the agricultural machine is not limited to the tractor and may be a rice transplanter or a combine harvester.

As illustrated in FIG. 14, the tractor 1 includes a traveling vehicle body 3 including a traveling device 7, a prime mover 4, and a transmission 5. The traveling device 7 includes front wheels 7F and rear wheels 7R. The front wheels 7F may be of a wheel type or a crawler type. Also, the rear wheels 7R may be of a wheel type or a crawler type. The prime mover 4 is, for example, a diesel engine or an electric motor. The transmission 5 transmits a driving force to drive the traveling device 7 while speed-shifting the driving force and capable of switching the traveling of the traveling device 7 between forward traveling and backward traveling. The traveling vehicle body 3 is provided with a cabin 9. An operator's seat 10 is provided inside the cabin 9.

A lifting device 8 including, for example, a three-point linkage mechanism is provided on a rear portion of the traveling vehicle body 3. A working device 2 is detachably attached to the lifting device 8. The traveling vehicle body 3 can tow the working device 2 by coupling the working device 2 to the lifting device 8. The working device 2 performs work using a material. Examples of the working device 2 include a fertilizer spreading device that spreads fertilizer, an agricultural chemical spraying device that sprays agricultural chemicals, a seedling transplanter that transplants seedlings, and a seeder that scatters seeds. That is, the working device 2 supplies an agricultural field with a material such as a fertilizer, an agricultural chemical, seedlings, or seeds.

The working device 2 includes a container (hopper) 2a capable of storing (housing) a material, and a supply mechanism 2b that is provided on the container 2a and supplies the material inside the container 2a. Examples of the supply mechanism 2b include a retractable shutter that supplies the material dropped from the container 2a to an agricultural field and stops the supply of the material, a nozzle that spreads or sprays the material, and a pump that feeds the material. The structure of the working device 2 is not limited to the examples described above.

As illustrated in FIG. 1, the working device 2 includes a controller 2c that is configured or programmed to control the supply mechanism 2b and a display device 2d connected to the controller 2c. For example, a supply amount of the material per predetermined area (per unit area) [e.g., about 10 kg/10 a (1000 m$^2$)], a supply width (unit: m) of the material, or a charge amount (unit: kg) of the material charged into the container 2a can be input to the display device 2d. The controller 2c controls, for example, an opening amount (opening degree) of the supply mechanism 2b or the timing of opening or closing the supply mechanism 2b on the basis of, for example, the supply amount and the supply width (work width). The working device 2 preferably supplies the material in conjunction with a vehicle speed so that the supply amount per unit time is changed in conjunction with a moving speed (vehicle speed). When, for example, a switch provided on the display device 2d is operated to start supply of the material, the controller 2c outputs a signal (start signal) indicating the start of the supply to an in-vehicle network N1 (described later). When, for example, a switch is operated to finish the supply, the controller 2c outputs a signal (finish signal) indicating the finish of the supply to the in-vehicle network N1.

Figure 2:
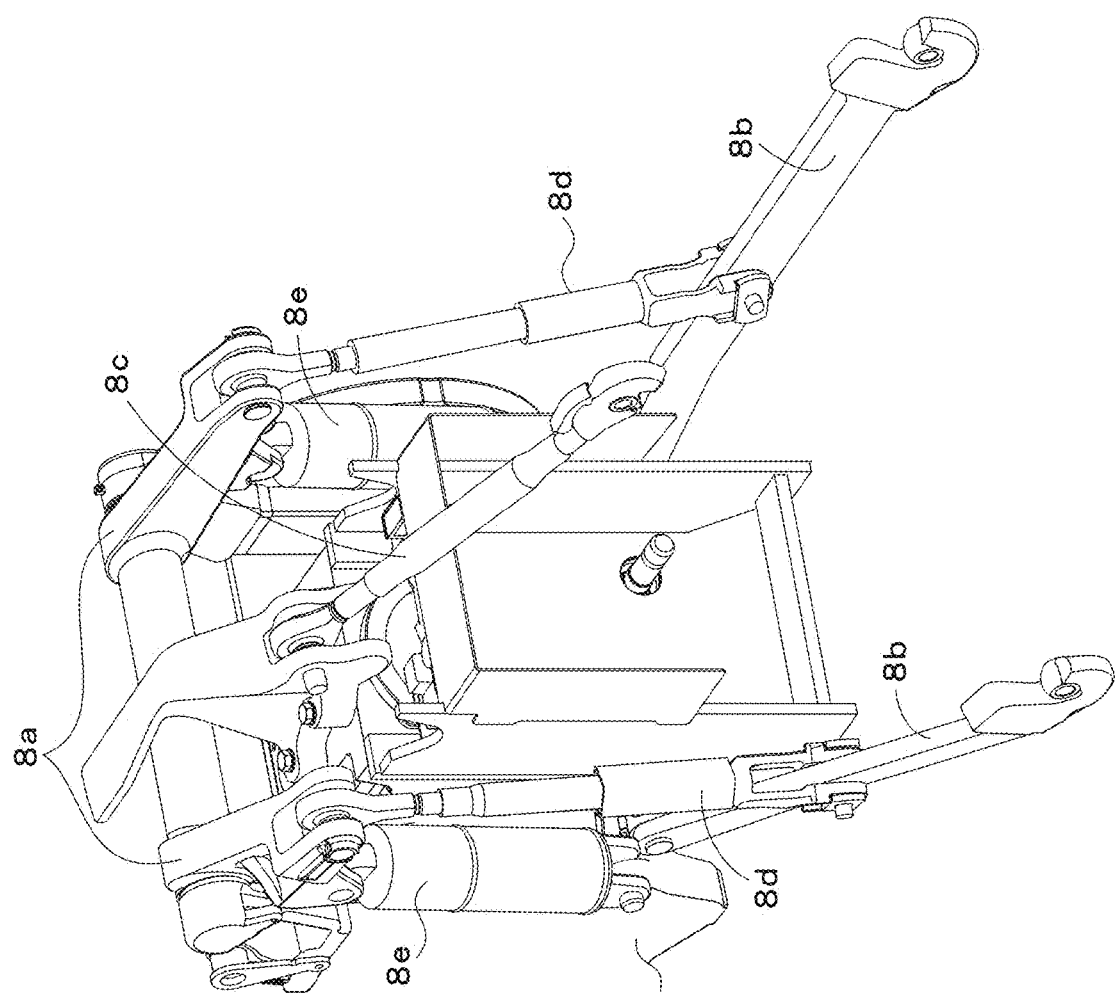
FIG. 2 is a diagram illustrating a lifting device.

As illustrated in FIG. 2, the lifting device 8 includes a lift arm 8a, a lower linkage 8b, a top linkage 8c, a lift rod 8d, and a lift cylinder 8e. A front end portion of the lift arm 8a is supported to be swingable upward or downward on a rear upper portion of a case (transmission case) in which the transmission 5 is housed. The lift arm 8a swings (rises and lowers) by driving of the lift cylinder 8e. The lift cylinder 8e may be a hydraulic cylinder, for example. The lift cylinder 8e is connected to a hydraulic pump through a control valve 36. The control valve 36 is, for example, a solenoid valve. The control valve 36 extends and contracts the lift cylinder 8e.

A front end portion of the lower linkage 8b is supported to be swingable upward or downward on a rear lower portion of the transmission 5. A front end portion of the top linkage 8c is supported to be swingable upward or downward on a rear portion of the transmission 5 above the lower linkage 8b. The lift rod 8d couples the lift arm 8a and the lower linkage 8b to each other. The working device 2 is coupled to a rear portion of the lower linkage 8b and a rear portion of the top linkage 8c. When the lift cylinder 8e is driven (extended or contracted), the lift arm 8a rises or lowers, and the lower linkage 8b coupled to the lift arm 8a through the lift rod 8d is raised or is lowered. Accordingly, the working device 2 swings upward or downward (rises or lowers) about a front portion of the lower linkage 8b serving as a fulcrum.

As illustrated in FIG. 1, the tractor 1 includes a steering device 29. The steering device 29 includes a steering wheel 30, a rotation shaft (steering shaft) 31 rotatable along with rotation of the steering wheel 30, and an assist mechanism (power steering mechanism) 32 that assists steering of the steering wheel 30. The assist mechanism 32 incudes a hydraulic pump 33, a control valve 34 to which a hydraulic fluid ejected from the hydraulic pump 33 is supplied, and a steering cylinder 35 operable by the control valve 34. The control valve 34 is a solenoid valve operable in accordance with a control signal. The control vale 34 is, for example, a 3-position switching valve switchable by, for example, movement of a spool. The control valve 34 is also switchable by steering of the steering shaft 31. The steering cylinder 35 is connected to an arm (knuckle arm) for changing the direction of the front wheels 7F.

Thus, when the steering wheel 30 is operated, a switching position and an opening degree of the control valve 34 are switched in response to the operation of the steering wheel 30, and the steering cylinder 35 extends or contracts leftward or rightward according to the switching position and the opening degree of the control valve 34. Accordingly, a steering direction of the front wheels 7F can be changed. The steering device 29 described above is merely an example, and the configuration of the steering device 29 is not limited to the above-described configuration.

The tractor 1 includes a positioning device 40. The positioning device 40 is capable of detecting its own position (positioning information including its latitude and longitude) using a satellite positioning system (positioning satellite) such as the D-GPS, the GPS, the GLONASS, the BeiDou, the Galileo, or the QZSS. That is, the positioning device 40 receives a satellite signal (e.g., a position of the positioning satellite, a transmission time, or correction information) transmitted from the positioning satellite and detects the position (e.g., the latitude and longitude) of the tractor 1, that is, the vehicle body position on the basis of the satellite signal. The positioning device 40 includes a receiver 41 and an inertial measurement unit (IMU) 42. The receiver 41 includes, for example, an antenna and receives a satellite signal transmitted from the positioning satellite. The receiver 41 is attached to the traveling vehicle body 3 separately from the inertial measurement unit 42. In the present preferred embodiment, the receiver 41 is attached to the traveling vehicle body 3, specifically, to the cabin 9. An attachment location of the receiver 41 is not limited to the location in the present preferred embodiment.

The inertial measurement unit 42 includes, for example, an acceleration sensor that detects an acceleration or a gyroscopic sensor that detects an angular velocity. The inertial measurement unit 42 is provided under the traveling vehicle body 3, for example, under the operator's seat 10 and can detect roll, pitch, and yaw angles of the traveling vehicle body 3.

As illustrated in FIG. 1, the tractor 1 includes a display device 50. The display device 50 includes a control unit 51, a display unit 52, and a storage unit 53. The control unit 51 is configured or programmed to include, for example, a CPU or an electric or electronic circuit and performs various control operations related to the display device 50. The display unit 52 includes, for example, a liquid crystal panel, a touch panel, or another panel, and is able to display various pieces of information. The storage unit 53 includes, for example, a nonvolatile memory. For example, an application program for assisting work of the tractor 1 is stored in the storage unit 53. When the application program is started, the display device 50 functions as a work assistance device that assists work. Also when the display device 50 functions as the work assistance device, the control unit 51, which is hardware, executes a process as the work assistance device.

Figure 3:
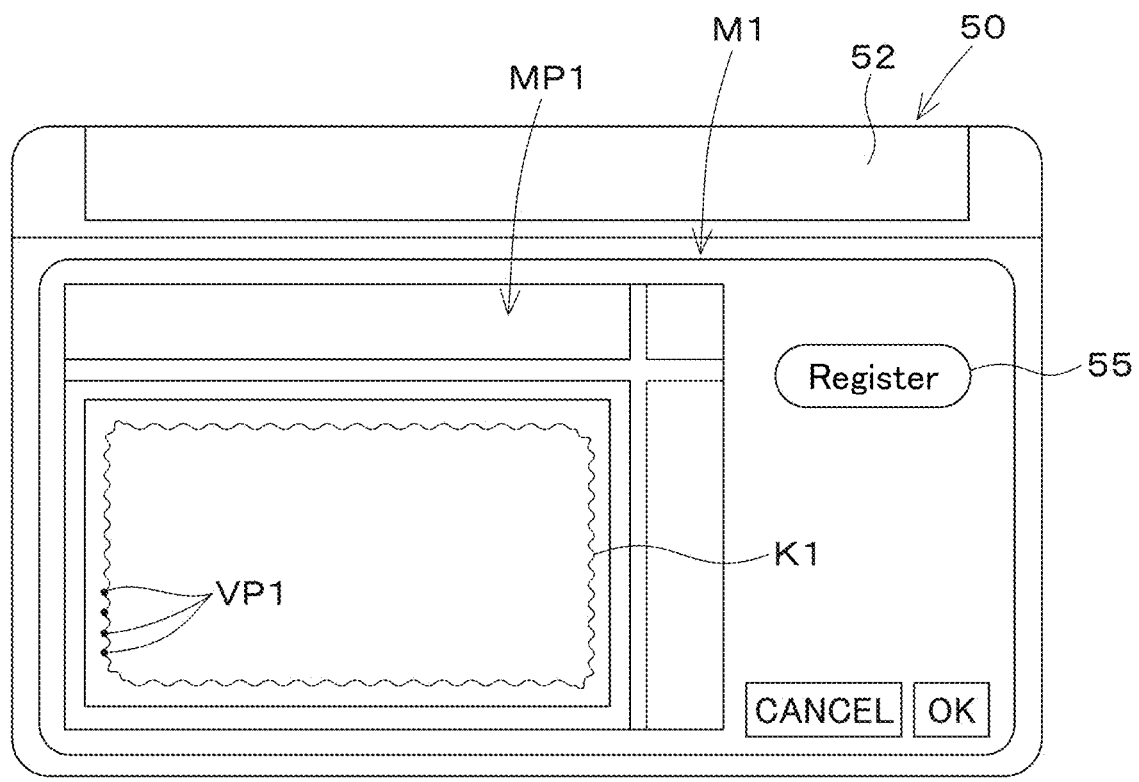
FIG. 3 is a diagram illustrating an example of a map registration screen.

As illustrated in FIG. 1, the control unit 51 of the display device (work assistance device) 50 is configured or programmed to include a map registration unit 51A. The map registration unit 51A registers an outline of a predetermined agricultural field, for example, a position corresponding to the outline of the predetermined agricultural field. As illustrated in FIG. 3, when a predetermined operation is performed on the display device 50, the map registration unit 51A displays a map registration screen M1 on the display unit 52.

Figure 4A:
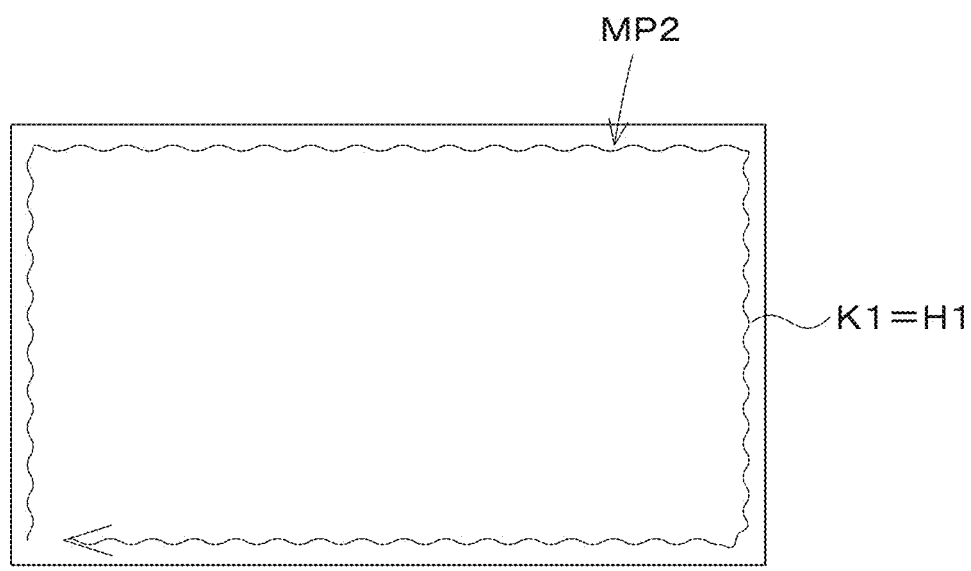
FIG. 4A is a diagram illustrating obtaining an outline of an agricultural field (agricultural map) from a traveling track.

A map MP1 including an agricultural field, a vehicle body position VP1 of the tractor 1, and agricultural field identification information such as an agricultural field name or an agricultural field management number are displayed on the map registration screen M1. Positional information such as the latitude and longitude is associated, in addition to image data representing the agricultural field, with the map MP1. When the tractor 1 enters the agricultural field and circles around inside the agricultural field, the current vehicle body position VP1 detected by the positioning device 40 when the tractor 1 circles around is displayed on the map registration screen M1. When a registration button 55 displayed on the map registration screen M1 is selected after the tractor 1 finishes circling around inside the agricultural field, as illustrated in FIG. 4A, the map registration unit 51A sets, as an outline (outer shape) H1 of the agricultural field, a traveling track K1 obtained from a plurality of vehicle body positions of the tractor 1 circling around and registers an agricultural field map MP2 indicated by the outline H1 together with the agricultural field identification information.

Figure 4C:
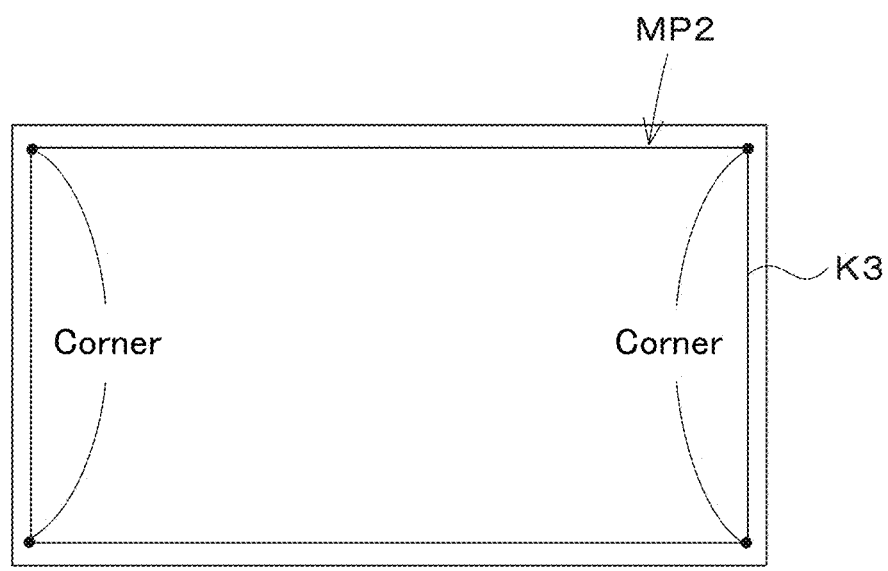
FIG. 4C is a diagram illustrating obtaining the outline (agricultural map) by a switch operation during traveling.

Alternatively, as illustrated in FIG. 4B, the map registration unit 51A may register, as the outline H1 of the agricultural field (agricultural field map MP2), an outline K2 connecting inflection points calculated from the traveling track indicated by the vehicle body positions VP1. As illustrated in FIG. 4C, the map registration unit 51A may register, as the outline H1 (agricultural field map MP2), an outline K3 connecting corners of the agricultural field designated by, for example, a driver using a switch provided on the tractor 1 when the tractor 1 circles around. The agricultural field registration methods described above are merely examples, and the registration method is not limited thereto. The outline of the agricultural field, that is, the agricultural field map MP2 may be data indicated by a position (latitude and longitude), data indicated by a coordinate system (X and Y axes), or data indicated by another expression.

The storage unit 53 stores the agricultural field map MP2 indicating the outline (outer shape) registered by the map registration unit 51A. That is, the storage unit 53 stores the agricultural field map MP2, that is, data indicating the outline of the agricultural field (data for representing a specified agricultural field).

As illustrated in FIG. 1, the control unit 51 of the display device (work assistance device) 50 is configured or programmed to include an area setting unit 51D. The area setting unit 51D sets a work area A2 and a replenishment area A5. When the work area A2 has already been set on the agricultural field map MP2, the area setting unit 51D may set only the replenishment area A5. In the present preferred embodiment, an example in which the area setting unit 51D sets both the work area A2 and the replenishment area A5 will be described.

Figure 5A:
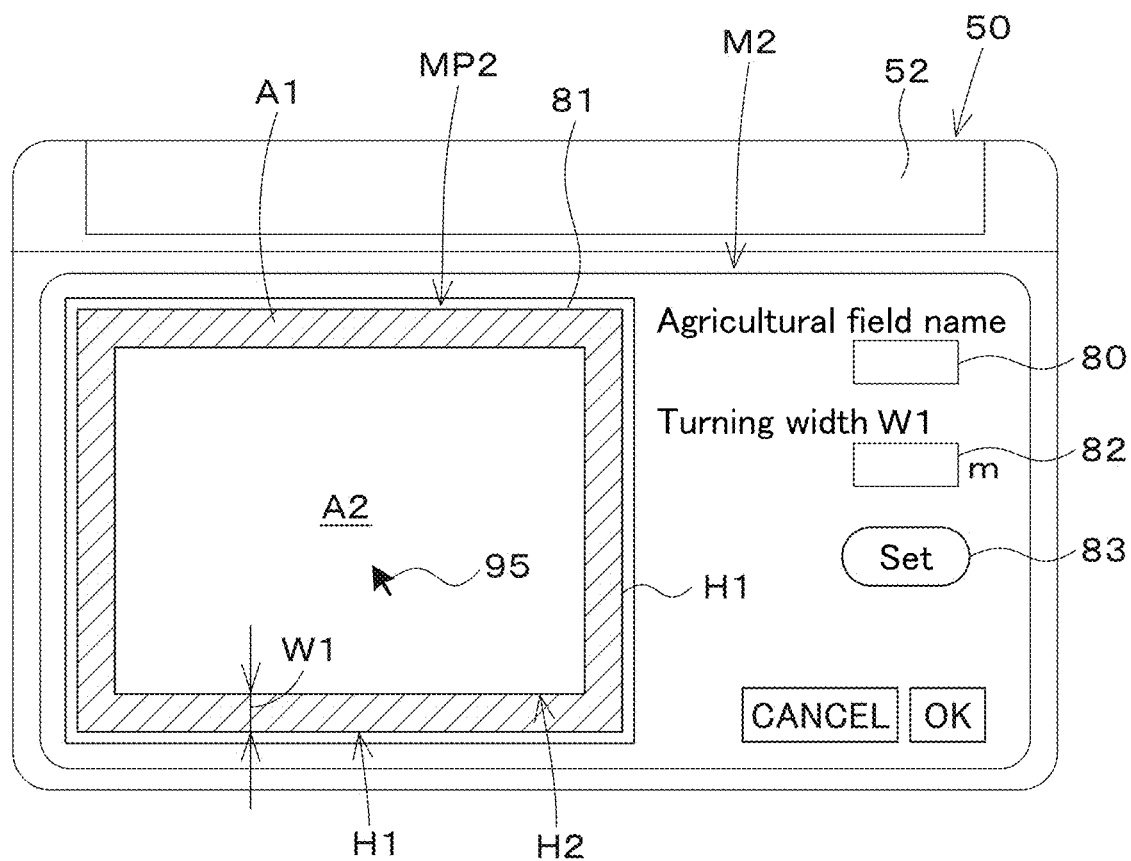
FIG. 5A is a diagram illustrating an example of a work setting screen.

As illustrated in FIG. 5A, when an operator (driver) performs a predetermined operation on the display device, the area setting unit 51D displays a work setting screen M2 on the display unit 52. The work setting screen M2 includes an agricultural field input portion 80 and an agricultural field display portion 81. Agricultural field identification information such as the agricultural field name or the agricultural field management number can be input to the agricultural field input portion 80. The agricultural field display portion 81 displays the agricultural field map MP2 indicating a predetermined agricultural field corresponding to the agricultural field identification information input to the agricultural field input portion 80. That is, the area setting unit 51D invokes, from the storage unit 53, the agricultural field map MP2 corresponding to the agricultural field identification information input to the agricultural field input portion 80 and displays, on the agricultural field display portion 81, the agricultural field map MP2 transmitted from the storage unit 53.

On the agricultural field map MP2, when a turning width W1 is input to a turning width input portion 82 and a turning setting button 83 is selected, the area setting unit 51D displays the work area A2 except for a turning area A1 on the agricultural field map MP2 displayed on the agricultural field display portion 81. For example, the area setting unit 51D sets, as the work area A2, an area surrounded by an outline H2 that is offset inward by the turning width W1 from the outline H1 of the agricultural field map MP2. On the work setting screen M2, the work area A2 may be set on the agricultural field map MP2 displayed on the agricultural field display portion 81 by designating the position of the outline of the work area A2 on the agricultural field map MP2 using, for example, a pointer.

Figure 5B:
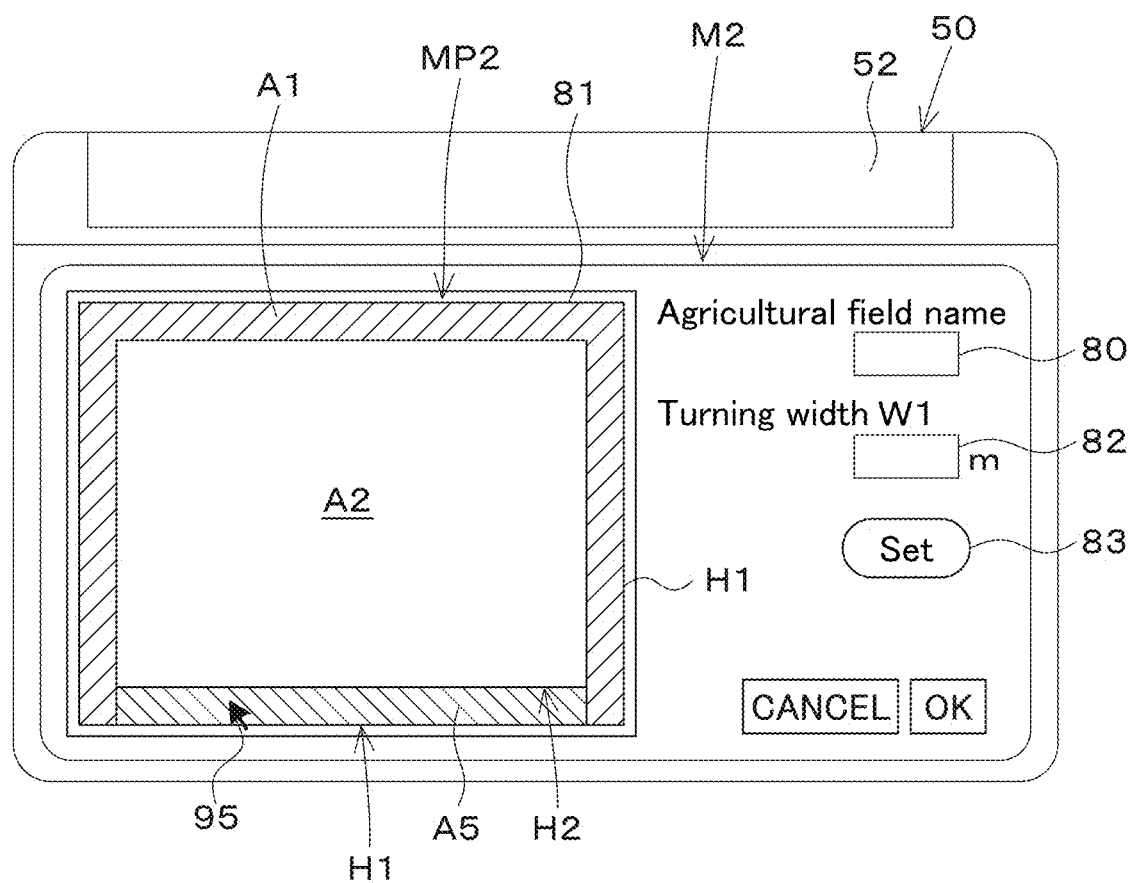
FIG. 5B is a diagram illustrating an example of the work setting screen with a replenishment area set thereon.
Figure 6:
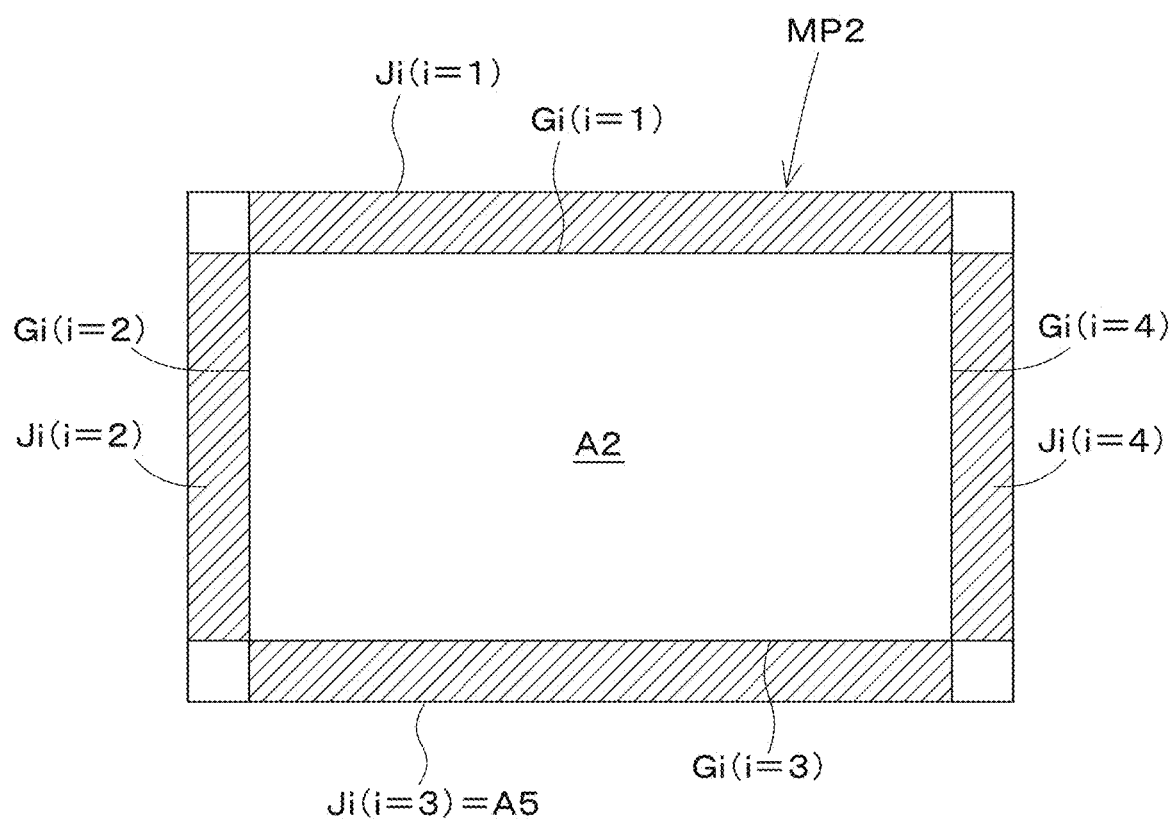
FIG. 6 is an explanatory diagram for explaining setting of the replenishment area.

The area setting unit 51D shifts to a process for setting the replenishment area A5 after setting the work area A2. The area setting unit 51D performs the process using, for example, a pointer 95 displayed on the work setting screen M2. When an area outside the work area A2 (external area), i.e., the turning area A1, is selected using the pointer 95, the selected turning area A1 is set as the replenishment area A5. Specifically, for example, as illustrated in FIG. 6, the work area A2 has a plurality of sides Gi (i=1, 2, 3, 4 . . . i), and the turning area A1 is divided into a plurality of areas Ji (i=1, 2, 3, 4 . . . i) in contact with the plurality of sides Gi. In this case, among the plurality of areas Ji, an area Ji selected using the pointer 95 is set as the replenishment area A5. For example, when the work area A2 has four sides G1, G2, G3, and G4, the turning area A1 includes four areas J1, J2, J3, and J4. When the area J3 is selected from the four areas J1, J2, J3, and J4, as illustrated in FIG. 5B, the area setting unit 51D sets the area J3 as the replenishment area A5, and the replenishment area A5 set outside the work area A2 is displayed on the work setting screen M2. In this manner, the area Ji in contact with, for example, an agricultural road outside the work area A2 can be set as the replenishment area A5 corresponding to the shape of the agricultural field, that is, the shape of the work area A2.

The storage unit 53 stores data of the agricultural field map MP2 with the work area A2 and the replenishment area A5 set thereon (data indicating the position of the work area A2 and data indicating the replenishment area A5).

As illustrated in FIG. 1, the control unit 51 of the display device (work assistance device) 50 is configured or programmed to include a route creation unit 51B. The route creation unit 51B refers to the agricultural map MP2 registered in the storage unit 53 and creates a traveling route (planned traveling route) L1 for the traveling vehicle body 3 on the agricultural field map MP2.

Figure 7:
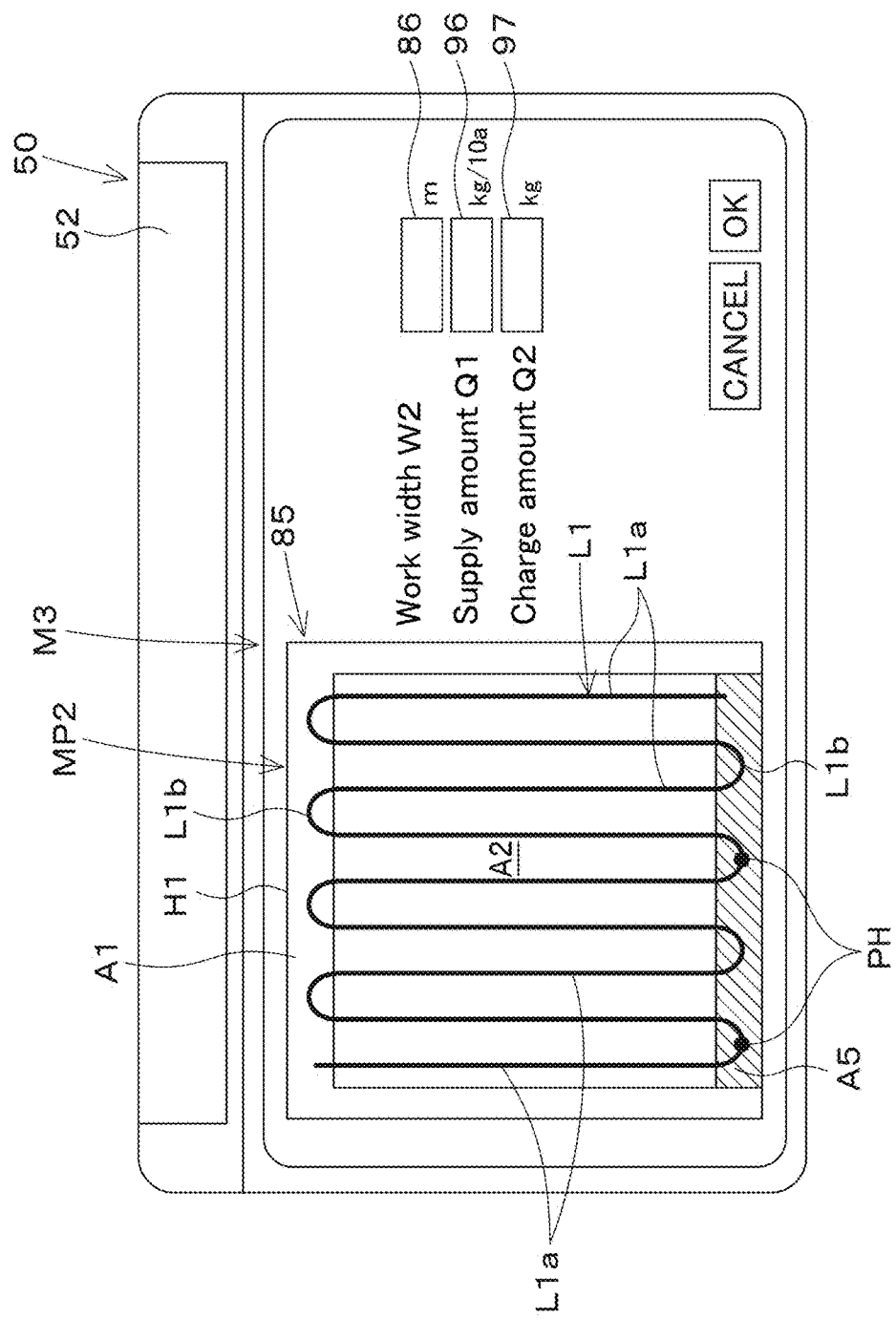
FIG. 7 is a diagram illustrating an example of a route setting screen.

As illustrated in FIG. 7, when an operator (driver) performs a predetermined operation on the display device, the route creation unit 51B displays a route setting screen M3 on the display unit 52. On the route setting screen M3, the planned traveling route L1 can be set at least in the work area A2 in the agricultural field. The route setting screen M3 includes a route display portion 85 that displays the planned traveling route L1 and a width input portion 86. A work width W2 of the working device 2 is a width (a work execution width) by which the working device 2 performs work on the ground such as an agricultural field. In the case where the working device 2 spreads the material onto the agricultural field, the work width W2 is a spreading width by which the material is supplied. For example, in a case where the working device 2 is a fertilizer applicator, a fertilizer application width corresponds to the work width W2. In a case where the working device 2 is a chemical spraying device, a chemical spraying width corresponds to the work width W2. In a case where the working device 2 is a seedling transplanter, a planting width by which seedlings can be planted into the agricultural field in one operation cycle corresponds to the work width. In a case where the working device 2 is a seeder, a seeding width corresponds to the work width W2. Ground work means agricultural work performed on an agricultural field and for a crop planted on the agricultural field. Examples of the ground work include seedling planting, irrigation, chemical spraying, fertilizer spreading (fertilizer application), scattering of seeds (seeding), compaction, soil covering, ridge forming, tilling, and groove forming.

Figure 8A:
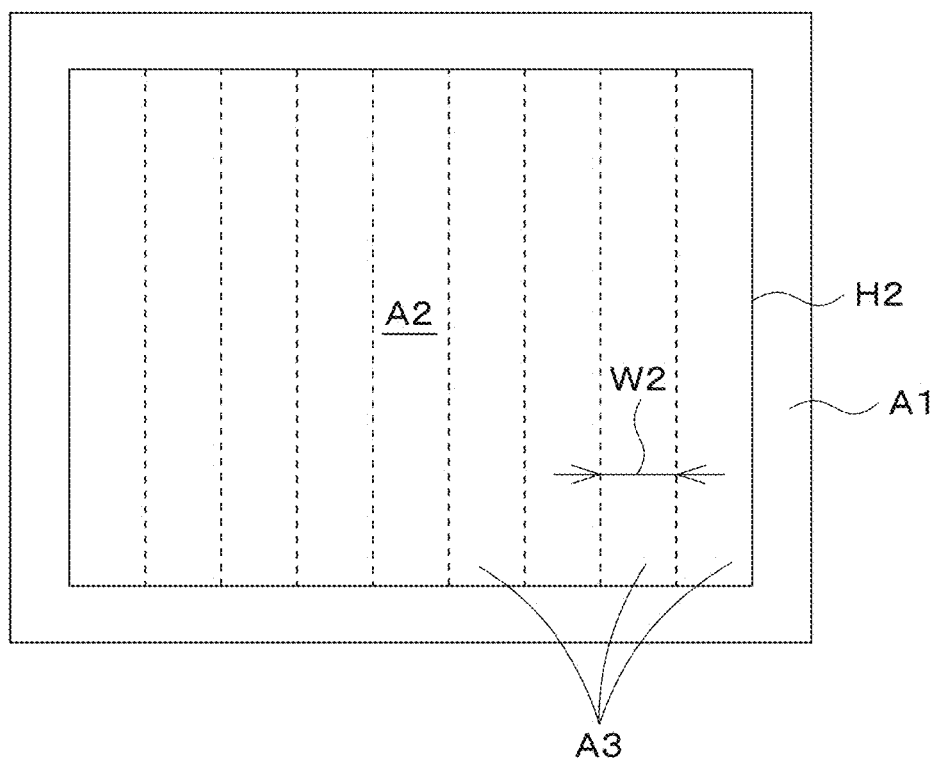
FIG. 8A is a diagram illustrating a unit work section created in a work area.
Figure 8B:
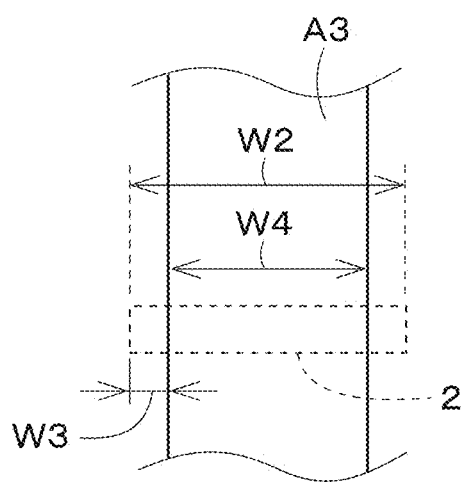
FIG. 8B is a diagram illustrating a unit work section different from that in FIG. 8A.

When the route creation unit 51B acquires the work width W2, as illustrated in FIG. 8A, the route creation unit 51B divides the work area A2 with the work width W2 in the longitudinal or lateral direction to create, inside the work area A2, a plurality of unit work sections A3 where the working device 2 performs the work. That is, the route creation unit 51B creates, inside the work area A2, the plurality of unit work sections A3 each having the same width as the work width W2. As illustrated in FIG. 8B, the route creation unit 51B may create, inside the work area A2, a plurality of unit work sections A3 each having a width W4 obtained by subtracting an overlap width W3 from the work area W2. The overlap width W3 can be input on the route setting screen M3. That is, when the traveling vehicle body 3 with the working device 2 coupled thereto is caused to travel, the route creation unit 51B sets, as the unit work section A3, a minimum unit area where the working device 2 performs the work on the agricultural field.

As illustrated in FIG. 8C, the route creation unit 51B creates, for each unit work section A3 on the agricultural field map MP2, a straight-ahead section (a straight-ahead route) L1a on which the traveling vehicle body 3 travels straight ahead. That is, the route creation unit 51B, for example, creates the straight-ahead route L1a having a straight shape and connecting opposite ends in the longitudinal direction of the unit work section A3 on a center in the width direction of the unit work section A3. The route creation unit 51B creates a route passing through the replenishment area A5, that is, a route capable of connecting straight-ahead routes L1a adjoining each other inside the replenishment area A5. That is, the route creation unit 51B creates a turning section (turning route) L1b on which the traveling vehicle body 3 turns around so that the turning route L1b is located inside the replenishment area A5. In other words, the route creation unit 51B creates a portion of the planned traveling route L1 for automatic operation in the replenishment area A5 set outside the work area A2.

The route creation unit 51B is capable of associating the planned traveling route L1 with the vehicle speed (moving speed) of the tractor 1 (traveling vehicle body 3). For example, a vehicle speed input portion for inputting the vehicle speed is provided on the route setting screen M3, and the vehicle speed is input to the vehicle speed input portion. The route creation unit 51B associates the straight-ahead route L1a with the vehicle speed input to the vehicle speed input portion. The planned traveling route L1 (the straight-ahead route L1a and the turning route L1b) created by the route creation unit 51B is stored in the storage unit 53.

A supply input portion 96 for inputting a supply amount Q1 of the material supplied to the agricultural field and a charge input portion 97 for inputting a charge amount Q2 of the material charged into the working device 2 are displayed on the route setting screen M3. On the basis of the supply amount Q1 input to the supply input portion 96 and the charge amount Q2, the display device (work assistance device) 50 can obtain a remaining amount (theoretical remaining amount) Q3 of the material at a predetermined position in the agricultural field.

As illustrated in FIG. 1, the control unit 51 of the display device (work assistance device) 50 is configured or programmed to include a charge amount acquisition unit 51E and a remaining amount calculation unit 51F. The charge amount acquisition unit 51E acquires the charge amount of the material loaded on the working device 2. For example, before the work is started, the charge amount acquisition unit 51E acquires the charge amount Q2 input to the charge input portion 97 after the material is replenished.

On the basis of the charge amount Q2 (unit: kg) acquired by the charge amount acquisition unit 51E and a material consumption Q4 (unit: kg) of the material consumed by the work, the remaining amount calculation unit 51F calculates a remaining amount Q3 (unit: kg) of the material at the predetermined position. For example, the remaining amount calculation unit 51F obtains an area of the work (work area) by multiplying a travel distance of the working device 2 traveling on the straight-ahead route L1a by the work width (supply width) W2, and obtains, based on the work area and the supply amount per unit area, the material consumption Q4 (the amount of the material having been supplied to the agricultural field since the working device 2 charged with the material starts the work) at the predetermined position. The remaining amount calculation unit 51F obtains the remaining amount Q3 (unit: kg) of the material at the predetermined position on the straight-ahead route L1a by subtracting the material consumption Q4 (unit: kg) from the charge amount Q2 (unit: kg) of the material charged into the container 2a. The method for calculating the remaining amount Q3 described above is merely an example, and the calculation method is not limited thereto. Alternatively, the remaining amount calculation unit 51F may obtain the material consumption Q4 by multiplying the supply amount Q1 per unit time of the material supplied to the agricultural field by a time for which the tractor 1 travels straight ahead on the straight-ahead route L1a and obtain the remaining amount Q3 of the material at the predetermined position on the straight-ahead route L1a by subtracting the material consumption Q4 from the charge amount Q2. The remaining amount Q3 of the material may be obtained by another method.

As illustrated in FIG. 1, the control unit 51 of the display device (work assistance device) 50 is configured or programmed to include a position setting unit 51G. The position setting unit 51G sets a replenishment position PH where the material is replenished in the replenishment area A5 on the basis of the remaining amount Q3 of the material. The position setting unit 51G sets the replenishment position PH in the replenishment area A5 so that, in a state where the working device 2 coupled to the tractor 1 supplies the material while the tractor 1 travels on the straight-ahead route L1a, the remaining amount of the material does not become zero before the working device 2 reaches the replenishment area A5.

Figure 9:
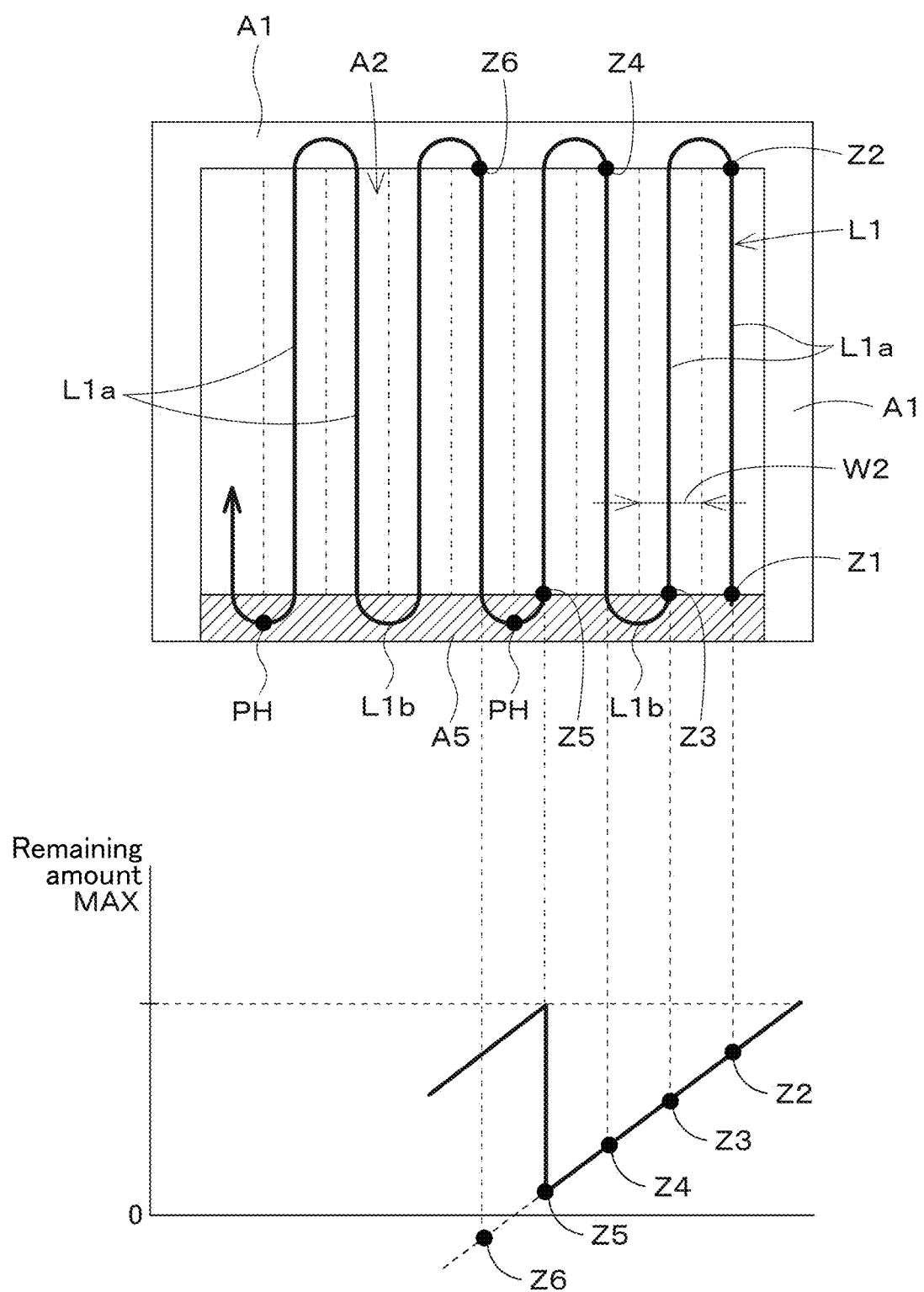
FIG. 9 is an explanatory diagram for explaining transitions in a remaining amount of a material.

Suppose that the remaining amounts of the material at end positions Z1 to Z6 of the respective straight-ahead routes L1a are as illustrated in FIG. 9. On the turning route L1b leading from the end position Z3 adjacent to the replenishment area A5, the replenishment position PH does not have to be set because the remaining amount is not zero at the end position Z3. On the other hand, at the end position Z5, the remaining amount is small. Thus, as indicated by a virtual line, if the material is not replenished at the end position Z5, the remaining amount becomes zero at the end position Z6 opposite to the replenishment area A5. Thus, the position setting unit 51G sets the replenishment position PH at least on the turning route L1b leading from the end position Z5. Although, in FIG. 9, the replenishment position PH is set on the turning route L1b leading from the end position Z5, the position setting unit 51G may set the replenishment position PH on the turning route L1b leading from the end position Z3. That is, the position setting unit 51G sets the replenishment position PH on any of the turning routes L1b arranged on the same side among the plurality of turning routes L1b. Setting the replenishment positions PH on the turning routes L1b arranged on the same side in this manner can facilitate the replenishment. When the position setting unit 51G sets the replenishment position PH, the replenishment position PH set by the position setting unit 51G is stored in the storage unit 53.

Figure 10A:
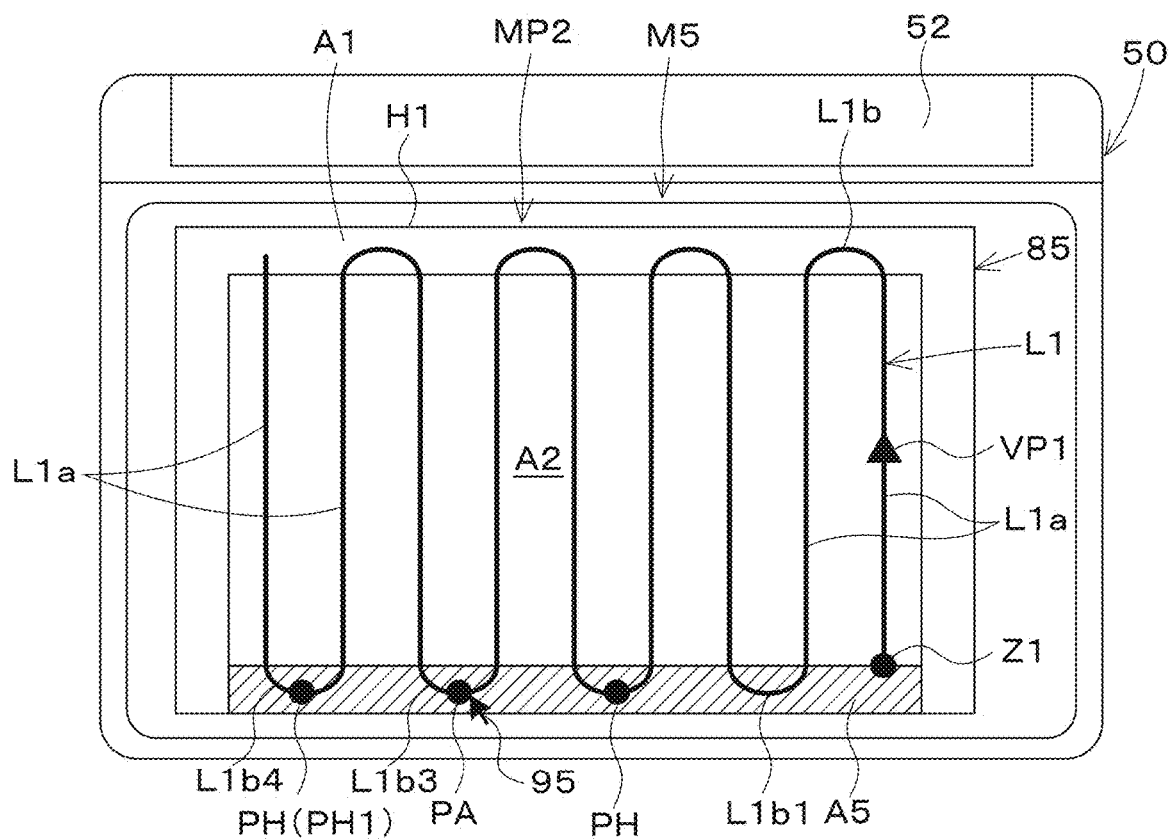
FIG. 10A is a diagram illustrating an example of an operation screen.
Figure 10B:
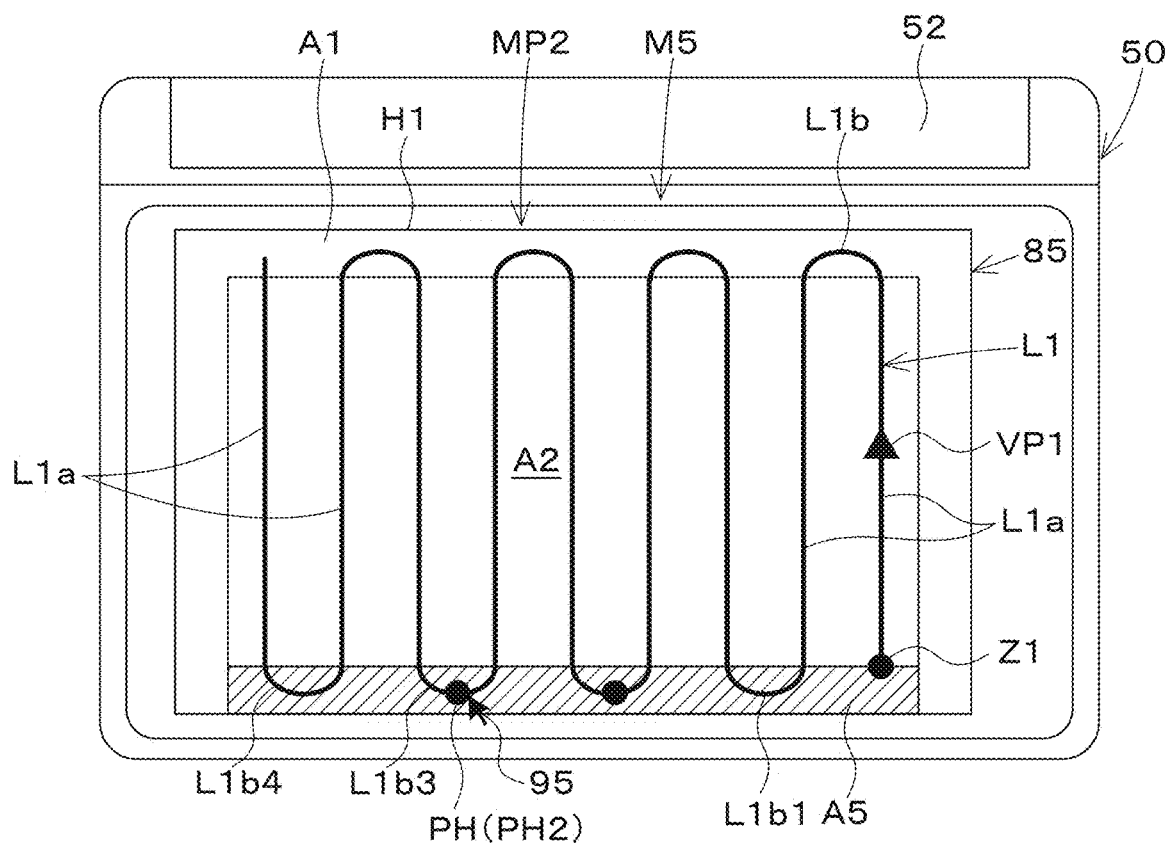
FIG. 10B is a diagram illustrating an example of the operation screen displayed when a replenishment position is changed.

When the automatic operation is performed, as illustrated in FIGS. 10A and 10B, an operation screen M5 is displayed on the display unit 52 of the display device (work assistance device) 50. For example, the work area A2, the replenishment area A5, the planned traveling route L1 (the straight-ahead route L1a and the turning route L1b), and the current position (vehicle body position) VP1 of the tractor 1 (the working device 2) are displayed on the operation screen M5. Although the work area A2, the replenishment area A5, the planned traveling route L1, and the vehicle body position VP1 are displayed on the operation screen M5 of FIGS. 10A and 10B, displayed details are not limited thereto.

Next, the automatic operation and the replenishment of the material will be described in detail.

As illustrated in FIG. 1, the tractor 1 includes a controller 60. The controller 60 is configured or programmed to control, for example, a traveling system and a work system of the tractor 1. An operation changeover switch 65 and a change reception switch 67 are connected to the controller 60. The operation changeover switch 65 is switchable between ON and OFF. The operation changeover switch 65 is capable of setting the controller 60 to an automatic operation mode when the operation changeover switch 65 is turned ON, and is capable of setting the controller 60 to a manual operation mode when the operation changeover switch 65 is turned OFF. The change reception switch 67 is switchable between ON and OFF. The change reception switch 67 receives a change (positional change) of the replenishment position PH when the change reception switch 67 is turned ON, and does not receive a change (position change) of the replenishment position PH when the change reception switch 67 is turned OFF.

The controller 60 is configured or programmed to include an automatic operation control unit 63 and a position change unit 64. The automatic operation control unit 63 and the position change unit 64 each include, for example, an electric or electronic circuit provided on the controller 60 or a program stored in a CPU.

The automatic operation control unit 63 controls the automatic operation of the traveling vehicle body 3. The automatic operation control unit 63 starts the automatic operation when the controller 60 is in the automatic operation mode. As illustrated in FIG. 10C, when a deviation between the vehicle body position and the planned traveling route L1 is smaller than a threshold under a condition where the tractor 1 performs the automatic operation, the automatic operation control unit 63 maintains a rotation angle of the steering shaft (rotation shaft) 31. When the deviation between the vehicle body position and the planned traveling route L1 is equal to or larger than the threshold and the tractor 1 is located leftward of the planned traveling route L1, the automatic operation control unit 63 rotates the steering shaft 31 so that the steering direction of the tractor 1 becomes the rightward direction. When the deviation between the vehicle body position and the planned traveling route L1 is equal to or larger than the threshold and the tractor 1 is located rightward of the planned traveling route L1, the automatic operation control unit 63 rotates the steering shaft 31 to steer the tractor 1 leftward. In the above preferred embodiment, the steering angle of the steering device 29 is changed on the basis of the deviation between the vehicle body position and the planned traveling route L1. However, when an azimuth (vehicle body azimuth) of the traveling direction of the tractor 1 (traveling vehicle body 3) differs from an azimuth of the planned traveling route L1, that is, when an angle of the vehicle body azimuth relative to the planned traveling route L1 is equal to or larger than a threshold, the automatic operation control unit 63 may set the steering angle so that the angle becomes zero (the vehicle body azimuth F1 coincides with the azimuth of the planned traveling route L1). The automatic operation control unit 63 may set the final steering angle in automatic steering on the basis of the steering angle obtained on the basis of the deviation (position deviation) and the steering angle obtained on the basis of the azimuth (azimuth deviation). The setting of the steering angle in automatic steering in the above preferred embodiment is merely an example, and the setting of the steering angle is not limited thereto.

When the planned traveling route L1 and the vehicle speed are associated with each other, the automatic operation control unit 63 automatically changes, for example, a speed stage of the transmission or a rotation speed of the prime mover so that the current vehicle speed of the tractor 1 coincides with a vehicle speed corresponding to the planned traveling route L1.

The automatic operation control unit 63 causes the working device 2 to perform the ground work on the straight-ahead route L1a, to suspend the ground work and turn around on the turning route L1b, and to resume the ground work at a point in time when entering the straight-ahead route L1a.

As described above, the controller 60 enables the tractor 1 (traveling vehicle body 3) to perform the automatic operation.

When the driver turns on the change reception switch 67, that is, a position change is received during the automatic operation, the replenishment position PH set on the route setting screen M3 can be changed. As illustrated in FIG. 10A, when the position change unit 64 receives the position change, the position change unit 64 displays the pointer 95 on the operation screen M5. When a change destination position PA is selected in the replenishment area 5A after selection of a pre-change replenishment position PH (PH1) using the pointer 95, as illustrated in FIG. 10B, the position change unit 64 sets the selected position PA as a post-change replenishment position PH (PH2) and deletes the pre-change replenishment position. PH (PH1).

More specifically, in the replenishment area A5, among a plurality of turning routes L1b$n$ (n=1, 2, . . . n, where the turning route L1b1 (n=1) is closest to a work start point, and the turning route L1b$n$ (n=n) is closest to a work finish point) arranged in the traveling direction from the end position Z1 as the work start point, when the pre-change replenishment position PH (PH1) corresponding to the n-th turning route L1bn is changed, the position change unit 64 sets the post-change replenishment position PH (PH2) at a position corresponding to the (n−1)-th turning route L1bn−1 and deletes the pre-change replenishment position PH (PH1). In the case illustrated in FIGS. 10A and 10B, the pre-change replenishment position PH (PH1) corresponding to the fourth turning route L1b4 is changed to the post-change replenishment position PH (PH2) corresponding to the third turning route L1b3.

In other words, the position change unit 64 sets the post-change replenishment position PH (PH2) before the pre-change replenishment position PH (PH1) in the traveling direction on the planned traveling route L1. The post-change replenishment position PH (PH2) is stored in the storage unit 53.

In the above preferred embodiment, the post-change replenishment position PH (PH2) is selected after selection of the pre-change replenishment position PH (PH1) using the pointer 95. However, the position change unit 64 may receive only the position PA of the post-change replenishment position PH (PH2) through the pointer 95 and set the received position PA as the post-change replenishment position PH (PH2). In a case where the display unit 52 is a touch panel, the selection using the pointer 95 may be performed by an operation using a finger. The operation relating to the change of the replenishment position is not limited to the method described above.

Figure 11:
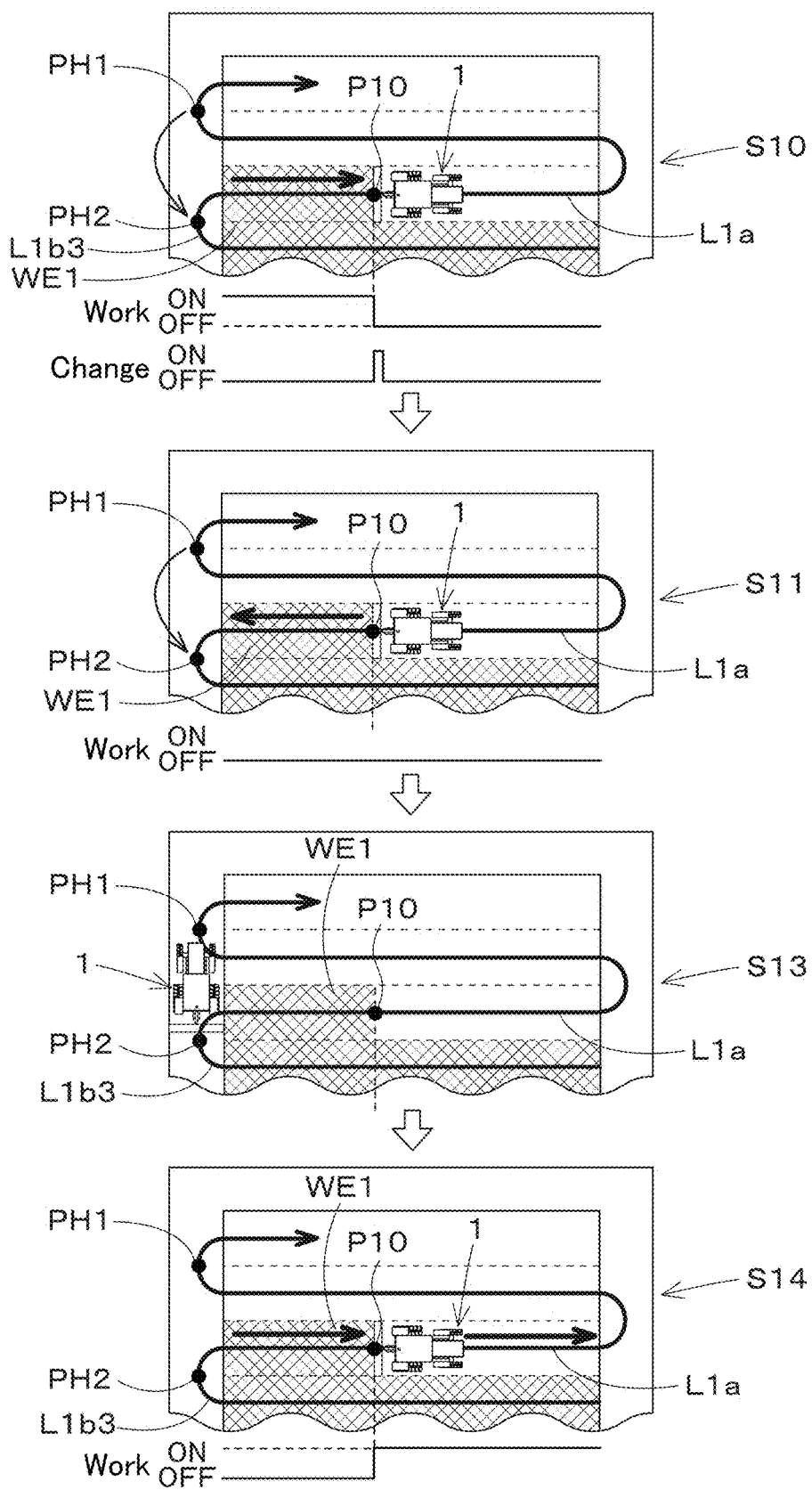
FIG. 11 is a diagram illustrating an example of the automatic operation performed when the replenishment position is changed.

FIG. 11 illustrates an operation of the tractor 1 (traveling vehicle body 3) operated by the automatic operation control unit 63 after the position change is received.

As illustrated in S10 of FIG. 11, for example, when the position change is received at a point P10 and the replenishment position is changed to the replenishment position PH (PH2) before the point P10 (rearward of the point P10 in the traveling direction), that is, when the replenishment position PH (PH2) is set on the turning route L1b3 after the tractor 1 (traveling vehicle body 3) passes through the turning route L1b3, the automatic operation control unit 63 stops the work by use of the working device 2 at the point P10 to temporarily end the work. For example, in the case of a spreading device (a fertilizer spreading device or an agricultural chemical spraying device), the automatic operation control unit 63 outputs a work stop signal to the controller 2c of the working device 2 to cause the spreading device to stop the spreading operation. Alternatively, the automatic operation control unit 63 outputs a work stop signal to a PTO clutch provided in the transmission 5 to switch the PTO clutch from an engaged state (where power of the PTO shaft is transmitted to the spreading device) to a disengaged state (where power of the PTO shaft is not transmitted to the spreading device), thereby causing the spreading device to stop the spreading operation.

Alternatively, the automatic operation control unit 63 outputs a raising signal to the control valve 36 for the lifting device 8 to raise the lift arm 8a until the lifting device 8 is turned from a working attitude to a retracted attitude (the attitude that disables the ground work). That is, at the point P10, the automatic operation control unit 63 outputs the work stop signal to the working device 2 or raises the lifting device 8, thereby stopping the ground work by use of the working device 2.

As illustrated in S11 of FIG. 11, when the ground work by use of the working device 2 is stopped, the automatic operation control unit 63 causes the tractor 1 (traveling vehicle body 3) to travel backward along the straight-ahead route L1a so as to move to a changed position that is the post-change replenishment position PH (PH2) while maintaining the state in which the ground work is stopped. That is, the automatic operation control unit 63 moves the tractor 1 to the changed position through a work trace WE1 where the working device 2 has performed the ground work.

As illustrated in S13 of FIG. 11, the automatic operation control unit 63 stops the tractor 1 (traveling vehicle body 3) when the tractor 1 reaches the turning route L1b3 corresponding to the post-change replenishment position PH (PH2).

As illustrated in S14 of FIG. 11, when replenishment of the material is completed at the post-change replenishment position PH (PH2), the automatic operation control unit 63 causes the tractor 1 (traveling vehicle body 3) to travel forward along the turning route Lb3 and the straight-ahead route L1a while maintaining the state in which the ground work is stopped. That is, the automatic operation control unit 63 moves the tractor 1 (traveling vehicle body 3) to the point (work end point) P10 through the work trace WE1 in a state where the working device 3 is stopped.

When the tractor 1 (traveling vehicle body 3) reaches the work end point P10, the automatic operation control unit 63 outputs a work start signal to the controller 2c of the working device 2 to resume the spreading operation. Alternatively, the automatic operation control unit 63 outputs a lowering signal to the control valve 36 to lower the lift arm 8a until it is set in the working attitude (the attitude that enables the ground work) to enable the working device 2 to perform the work.

That is, after the replenishment of the material, the automatic operation control unit 63 moves the tractor 1 (traveling vehicle body 3) to the work end point P10 to resume the ground work. After the work is resumed at the work end point P10, the automatic operation control unit 63 continues the ground work while moving the tractor 1 (traveling vehicle body 3) along the planned traveling route L1.

Figure 12:
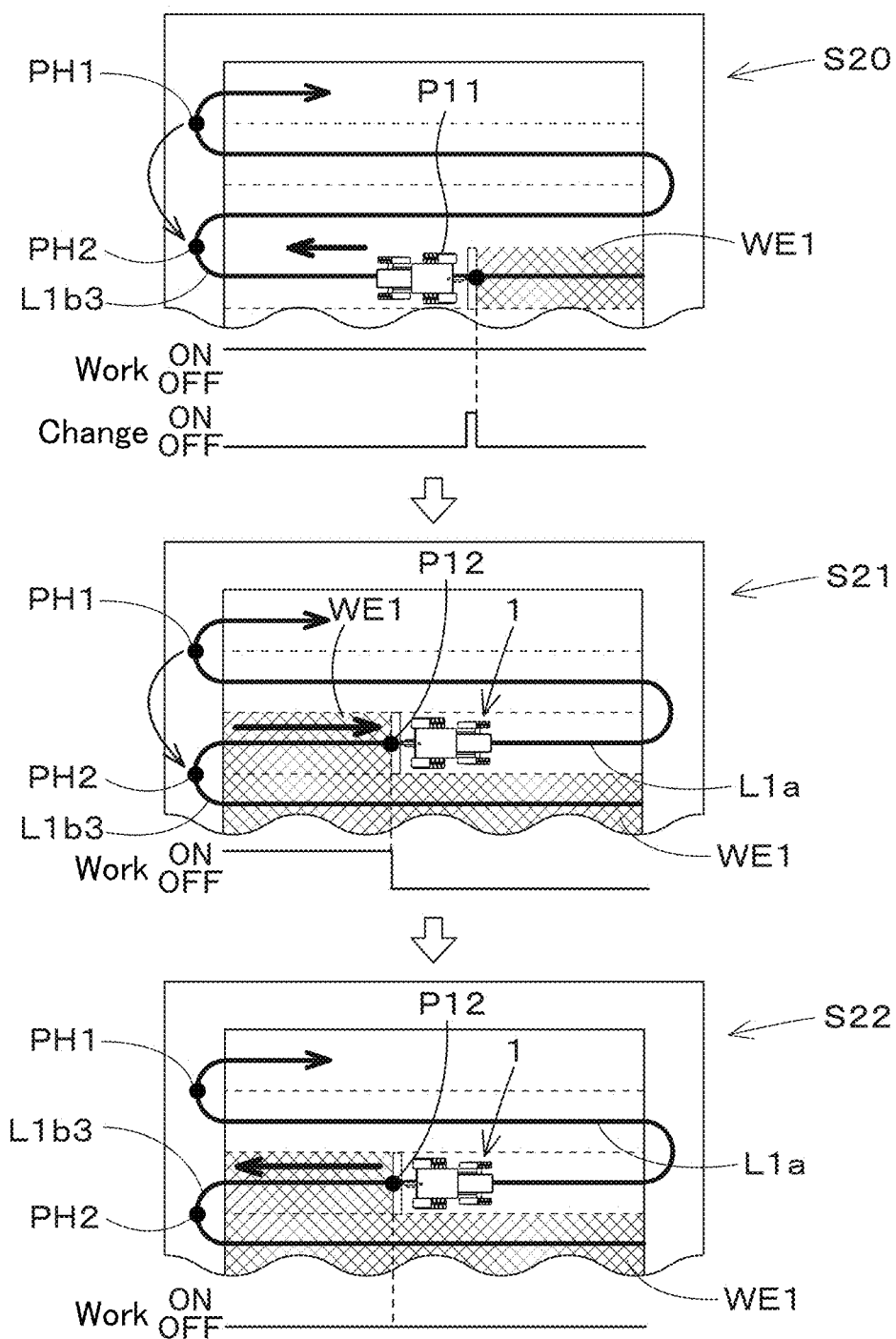
FIG. 12 is a diagram illustrating another example of the automatic operation performed when the replenishment position is changed, the example being different from the example in FIG. 11.

FIG. 12 illustrates an operation of the tractor 1 (traveling vehicle body 3) operated by the automatic operation control unit 63 after a position change is received, the operation being different from the operation in FIG. 11.

As illustrated in S20 of FIG. 12, for example, when a position change is received and the remaining amount Q3 of the material is not zero at a point P11 that is closer to the work start point than the turning route L1b3 is, the automatic operation control unit 63 causes the tractor 1 (traveling vehicle body 3) to travel forward along the straight-ahead route L1a and the turning route L1b (turning route L1b3) to continue the ground work of the working device 2 without stopping the ground work.

As illustrated in S21 of FIG. 12, when the remaining amount Q3 calculated by the remaining amount calculation unit 51F becomes zero at a point P12 located after the turning route L1b3, the ground work by use of the working device 2 is stopped at the point P12 to temporarily end the ground work.

As illustrated in S22 of FIG. 12, when the working device 2 stops the ground work, the automatic operation control unit 63 causes the tractor 1 (traveling vehicle body 3) to travel backward along the straight-ahead route L1a to the post-change replenishment position PH (PH2), i.e., the changed position, while maintaining the state where the ground work is stopped. Then, as with S13 of FIG. 11, the automatic operation control unit 63 stops the tractor 1 (traveling vehicle body 3) when the tractor 1 reaches the turning route L1b3 corresponding to the post-change replenishment position PH (PH2). As with S14 of FIG. 11, when replenishment of the material is completed, the automatic operation control unit 63 causes the tractor 1 (traveling vehicle body 3) to travel forward along the turning route L1$b$3 and the straight-ahead route L$ia$ while maintaining the state in which the ground work is stopped. As with S14 of FIG. 11, when the tractor 1 (traveling vehicle body 3) reaches the position (work finish position) P12, the ground work is resumed.

Figure 13:
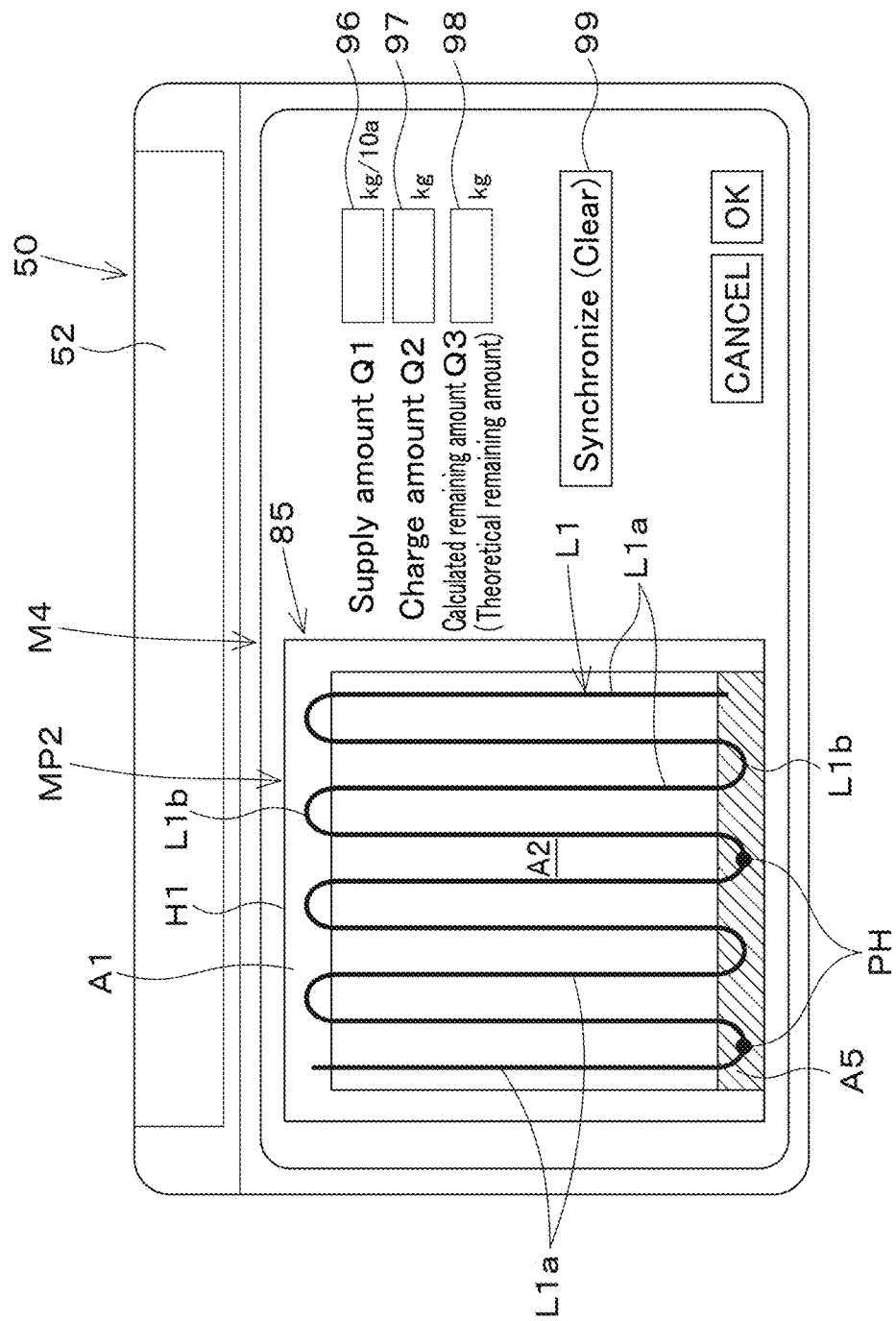
FIG. 13 is a diagram illustrating an example of a replenishment screen.

When a predetermined operation is performed on the display device (work assistance device) 50 in the replenishment of the material to the working device 2 at the replenishment position PH, as illustrated in FIG. 13, a setting screen (replenishment screen) M4 including at least the charge input portion 97 for inputting the charge amount Q2 of the material charged into the working device 2 is displayed. The charge amount acquisition unit 51E acquires the charge amount Q2 input to the charge input portion 97. The remaining amount calculation unit 51F calculates the remaining amount Q3 of the material at a predetermined position using, for example, the charge amount Q2, the supply amount Q1, and the work width W2. The position setting unit 51G resets the replenishment position PH after the current replenishment position PH. The position setting unit 51G may not reset the replenishment position PH after changing the replenishment position PH.

As illustrated in FIG. 13, when replenishment is performed at the replenishment position PH, the remaining amount Q3 of the material at the replenishment position PH, the remaining amount Q3 being calculated by the remaining amount calculation unit 51F, may not be zero, that is, the actual amount of the material (actual material remaining amount) may differ from the theoretical remaining amount Q3. Thus, by selecting a clear button 99 displayed on the replenishment screen M4, the remaining amount Q3 of the material at the current replenishment position PH and the charge amount Q2 input to the charge input portion 97 can be set to the same value, that is, the theoretical remaining amount can be reset. In the above preferred embodiment, the replenishment screen M4 is displayed when the material is replenished at the replenishment position PH. However, the replenishment screen M4 is not limited to the screen as that in the above preferred embodiment, and may be integrated with the operation screen M5, or items displayed on the replenishment screen M4 may be displayed on another screen.

During the automatic operation, when the remaining amount (theoretical remaining amount) Q3 of the material becomes equal to or smaller than a predetermined value (threshold), a buzzer may notify the driver of this, or the fact that the theoretical remaining amount Q3 is small may be displayed on the operation screen M5.

The agricultural machine 1 includes the traveling vehicle body 3 capable of traveling, the route creation unit 51B that creates the planned traveling route for the traveling vehicle body 3 in the work area A2 where the working device 2 provided on the traveling vehicle body 3 performs work using a material, the area setting unit 51D that sets, outside the work area A2, the replenishment area A5 where the material is replenished, the charge amount acquisition unit 51E that acquires the charge amount Q2 of the material loaded on the working device 2, the remaining amount calculation unit 51F that calculates the remaining amount Q3 of the material on the basis of the charge amount Q2 acquired by the charge amount acquisition unit 51E and the material consumption Q4 of the material consumed by the work, the position setting unit 51G that sets the replenishment position PH where the material is replenished in the replenishment area A5 set by the area setting unit 51D on the basis of the remaining amount calculated by the remaining amount calculation unit 51F, the change reception switch 67 that receives a change of the replenishment position PH, the position change unit 64 that changes the replenishment position PH when the change reception switch 67 receives the change, and the display unit 52 that displays the changed position that is the changed replenishment position PH. Accordingly, when the working device 2 actually performs work after the replenishment position PH is set in the replenishment area A5, the replenishment position PH can be changed if the remaining amount of the material is smaller than an expected amount. Thus, the material can be easily and efficiently replenished.

The route creation unit 51B creates the turning route L1$b$ passing through the replenishment area A5 from the work area A2 and returning to the work area A2 again. The position setting unit 51G sets the replenishment position PH in a portion of the replenishment area A5 corresponding to the turning route L1$b$. Accordingly, the replenishment can be performed near the turning route L1$b$ located outside the work area A2, which can facilitate the replenishment and reduce the influence of the replenishment on the work area A2.

The position setting unit 51G sets the replenishment position PH on turning routes L1$b$ having the same turning direction of the traveling vehicle body 3 among a plurality of turning routes L1$b$. Accordingly, since the replenishment position PH is set on the turning routes L1$b$ located on the same side, the replenishment can be efficiently performed.

The position change unit 64 sets the changed position before the replenishment position PH in the traveling direction of the planned traveling route L1 in the portion of the replenishment area A5 corresponding to the turning route L1$b$. Accordingly, the replenishment can be performed at a position as close as possible to the current position of the tractor 1 (traveling vehicle body 3). Thus, the efficiency of the work can be increased.

The agricultural machine 1 includes the automatic operation control unit 63 that causes the working device 2 to perform work while automatically operating the traveling vehicle body 3 on the basis of the planned traveling route L1. When the change reception switch 67 receives the change, the automatic operation control unit 63 causes, while the remaining amount Q3 of the material is not zero, the traveling vehicle body 3 to travel up to a position where the material runs out to end the work and then causes the traveling vehicle body 3 to return to the changed position. Accordingly, the replenishment can be performed after the material runs out. Thus, the number of replenishments of the material during the automatic operation can be reduced.

When the change reception switch 67 receives the change, the automatic operation control unit 63 stops the work performed by the working device 2 to end the work and then causes the traveling vehicle body 3 to return to the changed position. Accordingly, when the work is resumed after the replenishment of the material, the work can be accurately resumed at the position where the work is ended. Thus, waste in the work arising from the replenishment can be reduced or minimized.

After the replenishment of the material, the automatic operation control unit 63 moves the traveling vehicle body 3 to a point where the work is ended and resumes the work. Accordingly, compared to a case where the work is resumed at another place after the replenishment of the material, management and control in the automatic operation can be easily performed, and stable work can be continuously performed in the automatic operation.

The agricultural machine 1 includes the display device 50 that displays the setting screens M3 and M4 for setting the charge amount Q2 of the material. The charge amount acquisition unit 51E acquires the charge amount Q2 set on the setting screens M3 and M4 of the display device 50. Accordingly, a driver (operator) can easily input the charge amount Q2 of the material actually charged into the working device 2 using the setting screens M3 and M4, which makes it easy to respond to various situations compared to a system in which the charge amount Q2 is automatically input without using the setting screens M3 and M4.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. An agricultural machine comprising:
a traveling vehicle body capable of traveling;
a controller connected to a change reception switch and a display, the controller configured or programmed to:
create a planned traveling route for the traveling vehicle body in a work area where a working device provided on the traveling vehicle body performs work using a material;
set, outside the work area, a replenishment area where the material is replenished;
acquire a charge amount of the material loaded on the working device;
calculate a remaining amount of the material based on the charge amount and a material consumption of the material consumed by the working device;
set a replenishment position where the material is replenished in the replenishment area based on the remaining amount;
change the replenishment position when the change reception switch receives a change of the replenishment position;
create a turning route passing through the replenishment area from the work area and returning to the work area again;
set the replenishment position in a portion of the replenishment area corresponding to the turning route; and
set a changed position before the replenishment position in a traveling direction of the planned traveling route in the portion of the replenishment area corresponding to the turning route; wherein
the display is operable to display a changed position that is the changed replenishment position.

2. The agricultural machine according to claim 1, wherein the controller is configured or programmed to set the replenishment position on turning routes having a same turning direction of the traveling vehicle body among a plurality of the turning routes.

3. The agricultural machine according to claim 1, further comprising an automatic operation controller configured or programmed to cause the working device to perform the work while automatically operating the traveling vehicle body based on the planned traveling route; wherein
when the change reception switch receives the change, the automatic operation controller is configured or programmed to cause, in a case where a remaining amount of the material is not zero;
the traveling vehicle body to travel up to a position where the material runs out;
the working device to stop performing the work; and
then the traveling vehicle body to return to the changed position.

4. The agricultural machine according to claim 1, further comprising an automatic operation controller configured or programmed to cause the working device to perform the work while automatically operating the traveling vehicle body based on the planned traveling route; wherein
when the change reception switch receives the change, the automatic operation controller is configured or programmed to cause the working device to stop performing the work, and then to cause the traveling vehicle body to return to the changed position.

5. The agricultural machine according to claim 4, wherein, in a case where the working device is a spreading device, when the change reception switch receives the change, the automatic operation controller is configured or programmed to stop a spreading operation of the spreading device.

6. The agricultural machine according to claim 4, further comprising:
a PTO shaft to transmit power to the working device; and
a PTO clutch switchable between an engaged state where the power of the PTO shaft is transmitted to the working device and a disengaged state where the power of the PTO shaft is not transmitted to the working device; wherein
when the change reception switch receives the change, the automatic operation controller is configured or programmed to switch the PTO clutch from the engaged state to the disengaged state.

7. The agricultural machine according to claim 4, further comprising a lifter to raise and lower the working device so as to have an attitude switchable between a working attitude and a retracted attitude; wherein
when the change reception switch receives the change, the automatic operation controller is configured or programmed to turn the lifter from the working attitude to the retracted attitude.

8. The agricultural machine according to claim 3, wherein, after replenishment of the material, the automatic operation controller is configured or programmed to move the traveling vehicle body to a point where the working device stops performing the work, and cause the working device to resume work.

9. The agricultural machine according to claim 1, wherein the display is capable of displaying a setting screen to enable setting the charge amount of the material; and
the charge amount acquirer is configured or programmed to acquire the charge amount set on the setting screen of the display.

10. The agricultural machine according to claim 1, wherein the display is capable of displaying the planned traveling route, the replenishment area, and the replenishment position, and, when a change reception switch receives a change of the replenishment position, the display is capable of displaying the change of the replenishment position.

11. The agricultural machine according to claim 10, wherein, when a change destination replenishment position is selected in the replenishment area after selection of a pre-change replenishment position, the controller is configured or programmed to set the selected change destination replenishment position as a post-change replenishment position and delete the pre-change replenishment position.

12. The agricultural machine according to claim 10, wherein, after a replenishment position is selected, the controller is configured or programmed to set the selected replenishment position as a post-change replenishment position.

13. An agricultural machine comprising:
a traveling vehicle body capable of traveling;
a controller connected to a change reception switch and a display, the controller configured or programmed to:
create a planned traveling route for the traveling vehicle body in a work area where a working device provided on the traveling vehicle body performs work using a material;
set, outside the work area, a replenishment area where the material is replenished;
acquire a charge amount of the material loaded on the working device;
calculate a remaining amount of the material based on the charge amount and a material consumption of the material consumed by the working device;
set a replenishment position where the material is replenished in the replenishment area based on the remaining amount;
change the replenishment position when the change reception switch receives a change of the replenishment position;
cause the working device to perform work while automatically operating the traveling vehicle body based on the planned traveling route;
display a changed position that is the changed replenishment position; and
cause, in a case where a remaining amount of the material is not zero, when the change reception switch receives the change of the replenishment position:
the traveling vehicle body to travel up to a position where the material runs out;
the working device to stop performing the work; and then
the traveling vehicle body to return to the changed position.

14. The agricultural machine according to claim 13, wherein the controller is configured or programmed to:
cause the working device to perform the work while automatically operating the traveling vehicle body based on the planned traveling route; and
cause, when the change reception switch receives the change, the working device to stop performing the work, and the traveling vehicle body to return to the changed position.

15. The agricultural machine according to claim 13, further comprising:
a PTO shaft to transmit power to the working device; and
a PTO clutch switchable between an engaged state where the power of the PTO shaft is transmitted to the working device and a disengaged state where the power of the PTO shaft is not transmitted to the working device; wherein
when the change reception switch receives the change, the controller is configured or programmed to switch the PTO clutch from the engaged state to the disengaged state.

16. The agricultural machine according to claim 13, further comprising a lifter to raise and lower the working device so as to have an attitude switchable between a working attitude and a retracted attitude; wherein
when the change reception switch receives the change, the controller is configured or programmed to turn the lifter from the working attitude to the retracted attitude.

17. The agricultural machine according to claim 13, wherein, after replenishment of the material, the controller is configured or programmed to move the traveling vehicle body to a point where the working device stops performing the work, and cause the working device to resume the work.

18. An agricultural machine comprising:
a traveling vehicle body capable of traveling;
a controller connected to a change reception switch and a display, the controller configured or programmed to:
create a planned traveling route for the traveling vehicle body in a work area where a working device provided on the traveling vehicle body performs work using a material;
set, outside the work area, a replenishment area where the material is replenished;
acquire a charge amount of the material loaded on the working device;
calculate a remaining amount of the material based on the charge amount and a material consumption of the material consumed by the working device;
set a replenishment position where the material is replenished in the replenishment area based on the remaining amount;
change the replenishment position when the change reception switch receives a change of the replenishment position;
display a changed position that is the changed replenishment position;
cause the working device to perform the work while automatically operating the traveling vehicle body based on the planned traveling route; and
cause, when the change reception switch receives the change, the working device to stop performing the work, and the traveling vehicle body to return to the changed position.

19. The agricultural machine according to claim 18, wherein the controller is configured or programmed to:
cause, in a case where a remaining amount of the material is not zero, when the change reception switch receives the change of the replenishment position:
the traveling vehicle body to travel up to a position where the material runs out;
the working device to stop performing the work; and
the traveling vehicle body to return to the changed position.

20. The agricultural machine according to claim 18, further comprising:
a PTO shaft to transmit power to the working device; and
a PTO clutch switchable between an engaged state where the power of the PTO shaft is transmitted to the working device and a disengaged state where the power of the PTO shaft is not transmitted to the working device; wherein
when the change reception switch receives the change, the controller is configured or programmed to switch the PTO clutch from the engaged state to the disengaged state.

* * * * *